United States Patent
Veeraswamy et al.

(10) Patent No.: US 8,620,973 B1
(45) Date of Patent: Dec. 31, 2013

(54) CREATING POINT-IN-TIME COPIES OF FILE MAPS FOR MULTIPLE VERSIONS OF A PRODUCTION FILE TO PRESERVE FILE MAP ALLOCATIONS FOR THE PRODUCTION FILE

(71) Applicant: EMC Corporation, Hopkinton, MA (US)

(72) Inventors: Sairam Veeraswamy, South Grafton, MA (US); Peter C. Bixby, Westborough, MA (US); Peter W. Madany, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/626,741

(22) Filed: Sep. 25, 2012

(51) Int. Cl.
*G06F 17/00* (2006.01)

(52) U.S. Cl.
USPC .......... 707/822; 707/639; 707/673; 707/705; 707/825; 707/829

(58) Field of Classification Search
USPC .......... 707/639, 673, 705, 711, 822, 825, 829
See application file for complete search history.

(56) References Cited

U.S. PATENT DOCUMENTS

| | | | |
|---|---|---|---|
| 7,555,504 B2 | 6/2009 | Bixby et al. | |
| 7,818,535 B1 * | 10/2010 | Bono et al. | 711/173 |
| 7,870,356 B1 | 1/2011 | Veeraswamy et al. | |
| 8,032,498 B1 | 10/2011 | Armangau et al. | |
| 8,037,345 B1 * | 10/2011 | Iyer et al. | 714/6.12 |
| 8,117,160 B1 | 2/2012 | Tang et al. | |
| 8,190,850 B1 | 5/2012 | Davenport et al. | |
| 8,204,871 B1 * | 6/2012 | Pawar et al. | 707/705 |
| 8,250,035 B1 | 8/2012 | Tang et al. | |
| 8,285,758 B1 * | 10/2012 | Bono et al. | 707/822 |
| 8,285,967 B1 | 10/2012 | Veeraswamy et al. | |

OTHER PUBLICATIONS

Vahalia, Uresh, Unix Internals—The New Frontiers, 1996, p. 261-290, 338-371, Prentice-Hall, Inc., Upper Saddle River, NJ.
Dominic, Kay, Oracle Solaris ZFS Storage Management, Technical White Paper, Nov. 2011, 13 pages, Oracle Corporation, Redwood Shores, CA.
Best, Steve, How the Journaled File System cuts system restart times to the quick, Jan. 2000, 6 pages, IBM Corp., San Jose, CA.
"B Tree," Wikipedia, Aug. 5, 2011, 13 pages, Wikimedia Foundation Inc., St. Petersburg, FL.

* cited by examiner

*Primary Examiner* — Sana Al Hashemi
(74) *Attorney, Agent, or Firm* — Richard Auchterlonie; Novak Druce Connolly Bove + Quigg LLP

(57) ABSTRACT

To preserve the contiguity of file map extents of a production file when making a series of snapshot copies, the snapshots share indirect blocks of the production file through virtual pointers. When a write to a data block of the production file is first done since the time of the most recent snapshot so that the most recent snapshot can no longer share one of the contiguous indirect blocks, a new indirect block is allocated to store the file mapping metadata for the most recent snapshot, and a virtual pointer for the snapshots is changed to point to this new indirect block. Therefore the change in the virtual pointer changes the file mapping metadata for any number of snapshots sharing the new indirect block so that the method is scalable.

20 Claims, 24 Drawing Sheets

CREATING POINT-IN-TIME COPIES OF FILE MAPS FOR MULTIPLE VERSIONS OF A PRODUCTION FILE TO PRESERVE FILE MAP ALLOCATIONS FOR THE PRODUCTION FILE

FIELD OF THE INVENTION

The present invention relates generally to a file server that stores files using indirect blocks containing file mapping metadata. The file mapping metadata for each file maps the logical extent of the file to blocks of the file data. The present invention specifically relates to creating a point-in-time copy of such an indirect block for multiple versions of a production file so that the production file retains the original indirect block.

BACKGROUND OF THE INVENTION

For convenient reference to stored computer data, the computer data is typically contained in one or more files. Each file has a logical address space for addressing the computer data in the file. In a file server, an operating system program called a file system manager assigns each file a unique numeric identifier called a "file handle," and also maps the logical address space of the file to a storage address space of at least one data storage device such as a disk drive.

Typically a human user or an application program accesses the computer data in a file by requesting the file system manager to locate the file. After the file system manager returns an acknowledgement that the file has been located, the user or application program sends requests to the file system manager for reading data from or writing data to specified logical addresses of the file.

One of the major responsibilities of the file system manager is to manage and allocate storage space. Normally, a file will consist of a collection of extents of storage space. The extents themselves may consist of consistent sized pieces, known as file system blocks, or they may be of various size extents. Larger extents reduce the number of things that must be managed; however, larger extents may be counter-productive to file system features such as thin provisioning, block sharing, or block de-duplication. In addition, very large extents can make it costly to create small files or to use the storage space efficiently in the face of file creations and deletions. When large extents are normally used, the file system usually has mechanisms in place that allow files to be created from smaller entities, when large extents are not available (for example when the file system has aged and become fragmented).

In order to effectively support a variety of file sizes, possibly using various extent sizes, the file mapping is normally accomplished with some form of tree structure. Two commonly used tree structures are the Indirect Block Tree originally introduced in UNIX, while many newer file systems, such as Oracle's Solaris ZFS, use a form of B-tree to keep track of the extents.

A technique known as file versioning maintains read-only versions of a read-write production file by sharing file blocks between the production file and the read-only versions, and performing a copy-on-write to a newly allocated block for the production file when writing to a shared block. Each read-only version is a snapshot of the production file at a respective point in time. Read-only versions can be used for on-line data backup and data mining tasks.

In a copy-on-write file versioning method, the read-only version initially includes only a copy of the inode of the production file. Therefore the read-only version initially shares all of the data blocks as well as any indirect blocks of the production file. When the production file is modified, new blocks are allocated and linked to the production file inode to save the new data, and the original data blocks are retained and linked to the inode of the read-only version. The result is that disk space is saved by only saving the difference between two consecutive versions. If the production file becomes corrupted during a system crash, then typically the most recent read-only version is copied over to the production file in a recovery operation. In this case, there is a loss of the data that was written to the production file since the creation of the most recent read-only version.

One example of a copy-on-write file versioning method is disclosed in Bixby, et al. U.S. Pat. No. 7,555,504 issued Jun. 30, 2009, incorporated herein by reference. A protocol is provided for creating read-only and read-write snapshots, deleting snapshots, restoring the production file with a specified snapshot, refreshing a specified snapshot, and naming the snapshots. Block pointers are marked with a flag indicating whether or not the pointed-to block is owned by the parent inode. The pointed-to block can be either a data block or an indirect block. A non-owner marking is inherited by all of the block's descendants. The block ownership controls the copying of indirect blocks when writing to the production file, and also controls de-allocation and passing of blocks when deleting a read-only snapshot. For example, when the writing to the production file modifies a block pointer in an indirect block that is not owned by the production file, a new indirect block is allocated to the production file, the contents of the original indirect block are copied to the newly allocated indirect block, the block pointer in the newly allocated indirect block is modified, and the original indirect block remains in the snapshot copy that is the owner of the indirect block and in any more recent snapshot copies that may share the indirect block with the owner of the original indirect block.

SUMMARY OF THE INVENTION

It has been discovered that for a production file having one or more extents of contiguous indirect blocks of file mapping metadata, it is desired to retain the original indirect blocks in the production file when making a snapshot copy of the production file. Otherwise, the allocation of a new indirect block to the production file for changing a block pointer is most likely to break up the extents of indirect blocks in the production file so that the file cannot have a direct mapped file type. If the file has a direct mapped file type, then the contiguous nature of the map extents allows the address of any offset in the map to be calculated easily. This allows direct access to the map block without the need to traverse a map tree.

As introduced above, the file versioning method disclosed in Bixby, et al. U.S. Pat. No. 7,555,504 does not retain the original indirect blocks in the production file when the file mapping metadata in these original indirect blocks is modified for the production file. original indirect blocks are modified. Therefore the file versioning method disclosed in Bixby, et al. U.S. Pat. No. 7,555,504 requires modification when making a snapshot copy of a production file having the direct mapped file type. If the production file has a single snapshot, the file versioning method can be modified to retain an original indirect block in the production file by copying the content of the original indirect block to a newly allocated block before modifying a block pointer in the original indirect block, and modifying the snapshot copy by substituting a block pointer to the newly allocated block for the block pointer to the original indirect block.

When making a series of snapshot copies from the same production file, further difficulties arise in retaining an original indirect block in the production file because it is possible for more than one of the snapshot copies to share an original indirect block with the production file. In this case, when a block pointer in an original indirect block of the production file needs to be changed, each of the snapshot copies sharing the original block with the production file should be modified to substitute the newly allocated indirect block for the original indirect block. But this would appear to require a search in at least each of the snapshot copies that are sharing the original indirect block to discover where in each snapshot copy one would find the pointer to the original block.

The present invention provides a way of making a series of snapshot copies of a production file while modifying a block pointer in an original indirect block of the production file that is shared with more than one of the snapshot copies and keeping the original indirect block in the production file without searching more than one of the snapshot copies sharing the original indirect block for substituting a newly allocated block for the original block in each of the snapshot copies. This is done by using pointers into the maps of the snapshots. This preserves the ability to use large extents of contiguous indirect blocks in the production file while allowing changes to be made and the maps to be shared at a much smaller, file system block granularity.

In accordance with a first aspect, the invention provides a method of operating a file server. The file server has data storage storing a production file, a data processor coupled to the data storage for access to the production file, and non-transitory computer readable storage medium coupled to the data processor and storing computer instructions. The production file has data blocks and indirect blocks that are allocated to the production file and contain pointers to the data blocks for mapping block offsets in a logical extent of the production file to corresponding ones of the data blocks. The computer instructions, when executed by the data processor, create a series of snapshot copies of the production file while preserving the allocations of the indirect blocks to the production file by performing the steps of: (a) creating a first snapshot copy of the production file by allocating a first inode to the first snapshot copy and building a first tree of pointers extending from the first inode to a first group of the indirect blocks of the production file; and then (b) creating a second snapshot copy of the production file by allocating a second inode to the second snapshot copy and building a second tree of pointers extending from the second inode to a second group of the indirect blocks of the production file, wherein the first tree of pointers and the second tree of pointers share pointers to indirect blocks that are included in a third group of indirect blocks that are included in both the first group of the indirect blocks of the production file and the second group of the indirect blocks of the production file, and then (c) in response to a request from a client of the file server to write a block of new data to a specified block offset in the logical extent of the production file, writing the block of new data to the data storage, searching one of the first tree of pointers and the second tree of pointers to find one of the pointers to one of the indirect blocks that maps the specified block offset in the logical extent of the production file to a corresponding one of the data blocks including a block of old data, said one of the indirect blocks being included in the third group of indirect blocks, and allocating a new indirect block to the snapshots, copying contents of said one of the indirect blocks to the new indirect block, changing said one of the pointers to said one of the indirect blocks to point to the new indirect block, and changing the contents of one of the new indirect block and said one of the indirect blocks so that the new indirect block maps the block of old data to the specified block offset in the logical extent of the first snapshot copy and the second snapshot copy, and said one of the indirect blocks maps the block of new data to the specified block offset in the logical extent of the production file.

In accordance with another aspect, the invention provides a method of operating a file server. The file server has data storage storing a production file, a data processor coupled to the data storage for access to the production file, and non-transitory computer readable storage medium coupled to the data processor and storing computer instructions. The production file has data blocks and indirect blocks that are allocated to the production file and contain pointers to the data blocks for mapping block offsets in a logical extent of the production file to corresponding ones of the data blocks. The computer instructions, when executed by the data processor, create a series of snapshot copies of the production file while preserving the allocations of the indirect blocks to the production file by performing the steps of: (a) creating a first snapshot copy of the production file by allocating a first inode to the first snapshot copy and building a first tree of pointers extending from the first inode to a first group of the indirect blocks of the production file; and then (b) creating a second snapshot copy of the production file by allocating a second inode to the second snapshot copy and building a second tree of pointers extending from the second inode to a second group of the indirect blocks of the production file, wherein the first tree of pointers and the second tree of pointers share pointers to a third group of indirect blocks that are allocated to the production file and that are included in both the first group of the indirect blocks of the production file and in the second group of the indirect blocks of the production file; and then (c) in response to a request from a client of the file server to write a block of new data to a specified block offset in the logical extent of the production file, allocating a new block of the data storage, writing the block of new data to the new block of data storage, searching the first tree of pointers to find one of the pointers to one of the indirect blocks that maps the specified block offset in the logical extent of the production file to a corresponding one of the data blocks including a block of old data, said one of the indirect blocks being included in the third group of indirect blocks, and allocating a new indirect block to the snapshots, copying contents of said one of the indirect blocks to the new indirect block, changing the pointers to said one of the indirect blocks to point to the new indirect block, and changing the contents of said one of the indirect blocks so that the new indirect block maps the block of old data to the specified offset in the logical extent of the first snapshot copy and the second snapshot copy, and said one of the indirect blocks maps the block of new data to the specified block offset in the logical extent of the production file.

In accordance with a final aspect, the invention provides a file server. The file server includes data storage storing a production file, a data processor coupled to the data storage for access to the production file, and non-transitory computer readable storage medium coupled to the data processor and storing computer instructions. The production file has data blocks and indirect blocks that are allocated to the production file and contain pointers to the data blocks for mapping block offsets in a logical extent of the production file to corresponding ones of the data blocks. The computer instructions, when executed by the data processor, create a series of snapshot copies of the production file while preserving the allocations of the indirect blocks to the production file by performing the steps of: (a) creating a first snapshot copy of the production file by allocating a first inode to the first snapshot copy and building a first tree of pointers extending from the first inode to a first group of the indirect blocks of the production file; and then (b) creating a second snapshot copy of the production file by allocating a second inode to the second snapshot copy and building a second tree of pointers extending from the second inode to a second group of the indirect blocks of the production file, wherein the first tree of pointers and the second tree of pointers share pointers to a third group of indirect blocks that are included in both the first group of the indirect blocks of the production file and the second group of the indirect blocks of the production file, and then (c) in response to a request from a client of the file server to write a block of new data to a specified block offset in the logical extent of the production file, writing the block of new data to the data storage, searching one of the first tree of pointers and the second tree of pointers to find one of the pointers to one of the indirect blocks that maps the specified block offset in the logical extent of the production file to a corresponding one of the data blocks including a block of old data, said one of the indirect blocks being included in the third group of indirect blocks, and allocating a new indirect block to the snapshots, copying contents of said one of the indirect blocks to the new indirect block, changing said one of the pointers to said one of the indirect blocks to point to the new indirect block, and changing the contents of one of the new indirect block and said one of the indirect blocks so that the new indirect block maps the block of old data to the specified block offset in the logical extent of the first snapshot copy and the second snapshot copy, and said one of the indirect blocks maps the block of new data to the specified block offset in the logical extent of the production file.

BRIEF DESCRIPTION OF THE DRAWINGS

Additional features and advantages of the invention will be described below with reference to the drawings, in which.

Figure 1:
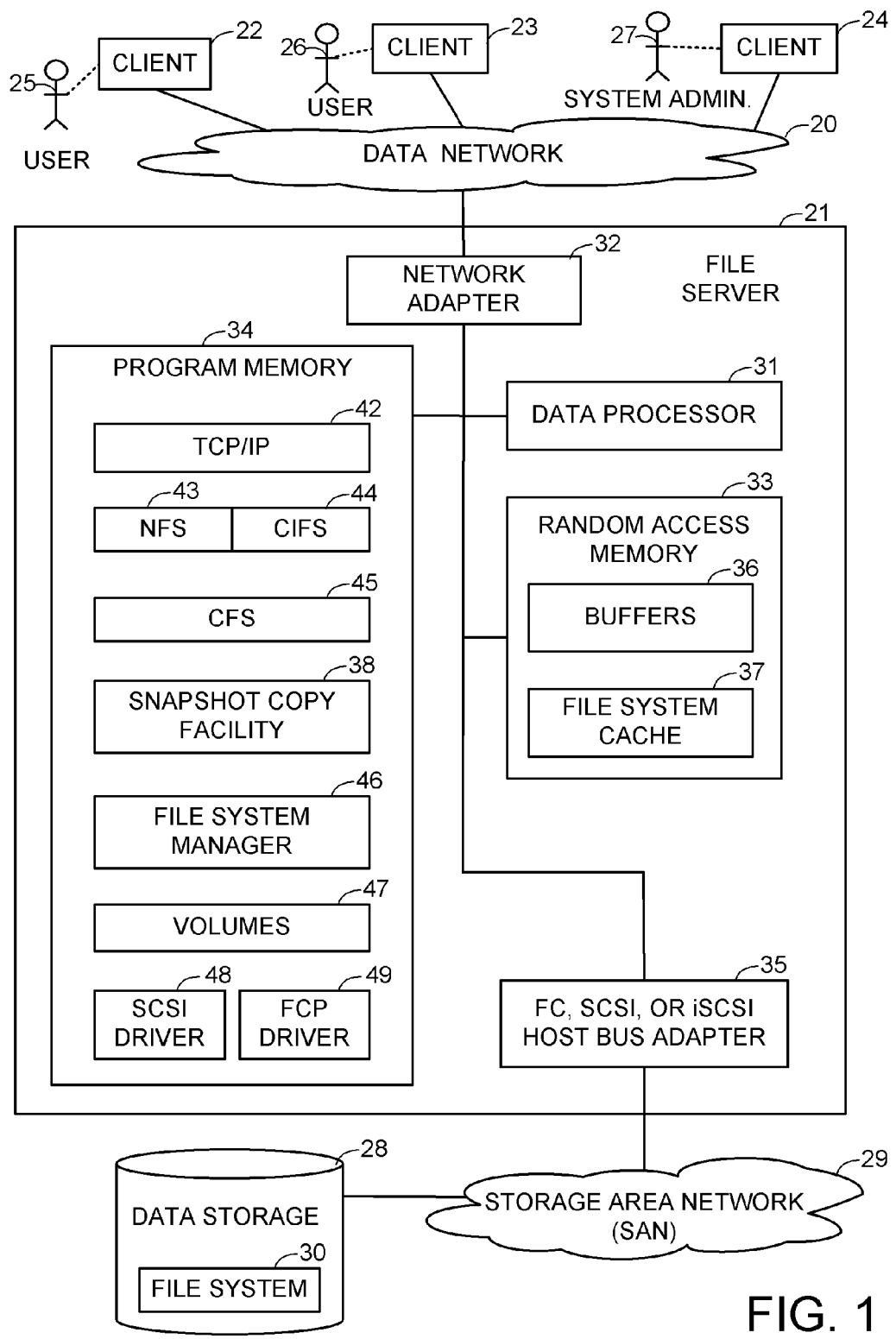
FIG. 1 is a block diagram of a data network including a file server incorporating the present invention.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data network 20 including a file server 21 for servicing file access requests from network clients 22, 23, 24. The network clients 22, 23, 24, for example, are workstations operated by respective human users 25, 26, 27. The file server permits the clients 22, 23, 24 to access files in a file system 30 stored in data storage 28 linked to the file server 21 via a storage area network (SAN) 29. The data storage 28, for example, is an array of disk drives.

The file server 21 includes a data processor 31, a network adapter 32 linking the data processor to the data network 20, random access memory 33, program memory 34, and a Fibre-Channel (FC), Small Computer Systems Interface (SCSI), or Internet Protocol SCSI (iSCSI) host bus adapter 35 linking the data processor to the storage area network (SAN) 29. The data processor 31 is a general purpose digital computer data processor including one or more core central processing units (CPUs) for executing computer program instructions stored in the program memory 34. The program memory 34 is a non-transitory computer readable storage medium, such as electrically erasable and programmable read-only memory (EEPROM). The random access memory 33 includes buffers 36 and a file system cache 37.

The program memory 34 includes a program layer 42 for network communication using the Transmission Control Protocol (TCP) and the Internet Protocol (IP). The program memory also includes a Network File System (NFS) module 43 for supporting file access requests using the NFS file access protocol, and a Common Internet File System (CIFS) module 44 for supporting file access requests using the CIFS file access protocol.

The NFS module 43 and the CIFS module 44 are layered over a Common File System (CFS) module 45. The CFS module 45 is layered over a file system manager module 46. The file system manager module 46 supports a UNIX-based file system, and the CFS module 45 provides higher-level functions common to NFS and CIFS. For example, the file system manager module 46 maintains the file system 30 in the data storage 28, and maintains the file system cache 37 in the random access memory 33. The conventional organization and management of a UNIX-based file system is described in Uresh Vahalia, Unix Internals—The New Frontiers, Chapter 9, File System Implementations, pp. 261-290, Prentice-Hall, Inc., Upper Saddle River, N.J. (1996).

The program memory 34 further includes a logical volumes layer 47 providing a logical volume upon which the file system 30 is built. The logical volume is configured from the data storage 28. For example, the logical volume is configured from one or more logical unit numbers (LUNs) of the data storage 28. The logical volumes layer 47 is layered over a SCSI driver 48 and a Fibre-Channel protocol (FCP) driver 49 in order to access the logical unit numbers (LUNs) in the storage area network (SAN) 29. The data processor 31 sends storage access requests through the host bus adapter 35 using the SCSI protocol, the iSCSI protocol, or the Fibre-Channel protocol, depending on the particular protocol used by the storage area network (SAN) 29.

The program memory 34 further includes a snapshot copy facility 38. The snapshot copy facility 38 creates a point-in-time copy of a production file while permitting read-write access to the production file. In this fashion, it is possible to make a snapshot copy of the production file and write a backup copy of the snapshot to the data storage 28 or to a client 22, 23, 24 concurrent with the read-write access to the production file. The snapshot copy facility 38 may use a method of sharing file system blocks among different versions of a file as described in Bixby et al. U.S. Pat. No. 7,555,504 issued Jun. 30, 2009, incorporated herein by reference.

It is desirable to use extents of indirect blocks for file mapping of large files. By using a single contiguous map (or a small number of very large map extents) to hold the data block addresses for a large file, it is possible for the file system manager 46 to obtain a data block address in at most one I/O operation upon the data storage 28. Further, because portions of the map may be cached in the file system cache 37, it is possible that the data block address may be obtained from the file system cache 37 without reading the map from the data storage 28. Therefore, in the worst case, the file mapping overhead will be only a single I/O operation upon the data storage 28.

A reduction in the map I/O is significant because the access time for a read or write to a data block is the sum of the access times for all of the I/Os required to access the data block. For example, in order to read a data block where two (2) levels of map need to be read to get the data block address, the total time to accomplish the read can be no better than the total time to read each of the map blocks and then the data block. This is because the read operations must be serialized, meaning that each read operation must be completed before the following read operation can start.

By using extents of indirect blocks for file mapping of a large file, it is possible for each data block in the file to be individually addressed by a respective block pointer in one of the indirect blocks. This use of block-level mapping, as opposed to simply mapping larger and larger extents of data blocks, allows for the control and manipulation of individual data blocks within the file. For example, in a system where snapshots are accomplished by writing new contents to a new data block (i.e. never overwriting the original content) the data block address for the new write may be appropriately adjusted. Similarly, in a file system that supports data de-duplication, common data blocks may be shared by simply adjusting the block pointers within the map.

Moreover, it is possible for some files in the file system to use extents of indirect blocks for file mapping, and other files in the file system to use a conventional tree structured index for file mapping. It is also possible for a file in the file system to use a sparse tree structured index for sharing blocks with a file that uses an extent of indirect blocks for file mapping.

Figure 2:
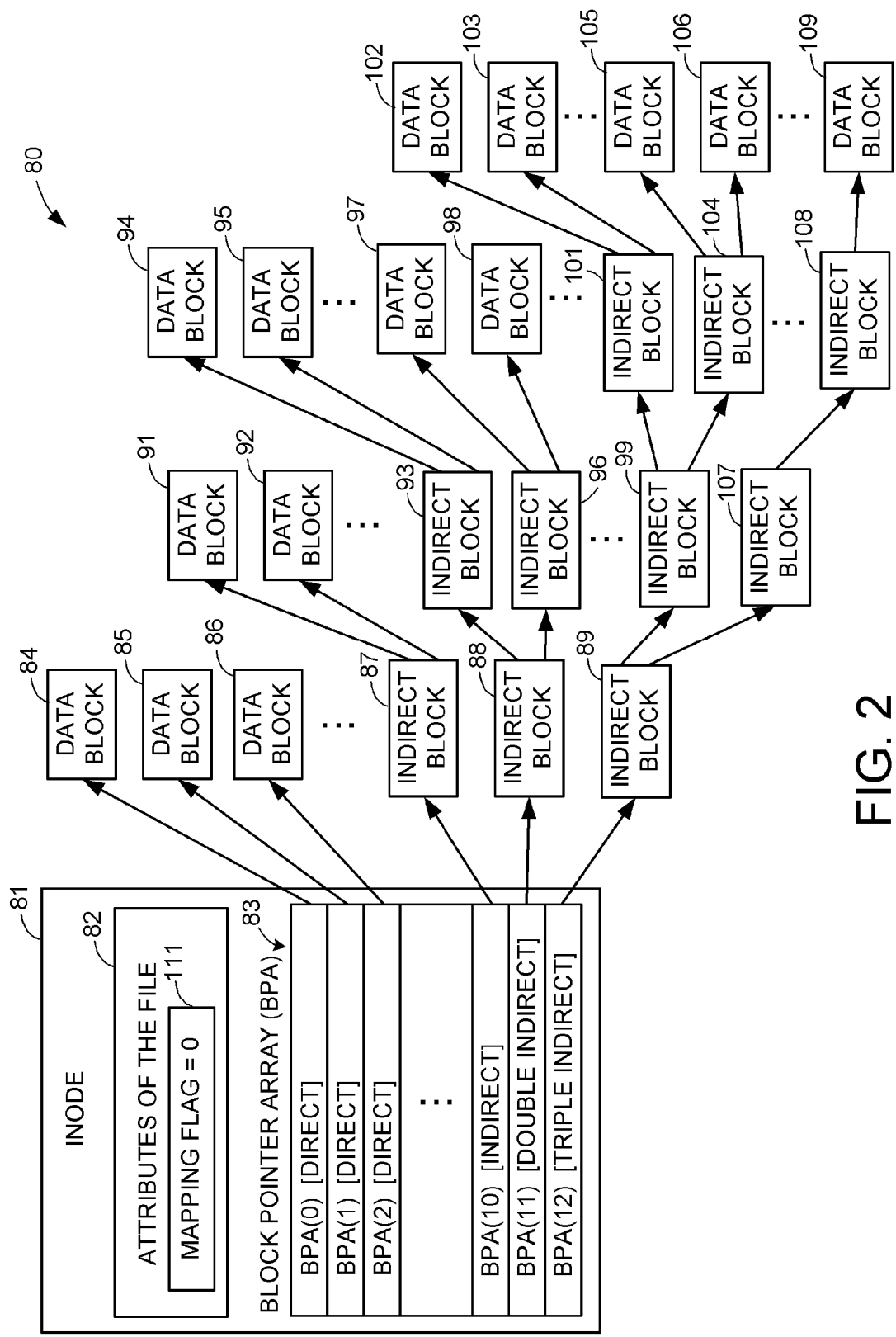
FIG. 2 is a block diagram of a file using a conventional tree structured index for file mapping.

For example, FIG. 2 shows a file 80 using a tree structured index for file mapping. The tree structured index is a tree of indirect blocks in accordance with the conventional mapping method of a UNIX-based file system. The file 80 includes an inode 81 containing attributes 82 of the file, and a block pointer array 83. The attributes 82 of the file include a mapping flag 111 set to zero to indicate that the file mapping is in accordance with the conventional mapping method of a UNIX-based file system.

In accordance with the conventional mapping method of a UNIX-based file system, the block pointer array 83 has thirteen entries having respective values BPA(0) to BPA(12). The first of up to ten entries BPA(0) to BPA(9) directly point to the first of up to ten data blocks 84, 85, 86, etc. of the file 80. (See Vahalia, FIG. 10-4, page 265.)

If the file 80 contains more than ten data blocks, then the eleventh entry of the block pointer array 83 contains an indirect block pointer BPA(10) pointing to an indirect block 87 containing pointers to one or more additional data blocks 91, 92, etc. If the file 80 contains so many data blocks that the indirect block 87 becomes full of block pointers, then the twelfth entry of the block pointer array 83 contains a double indirect block pointer BPA(11) to an indirect block 88 that itself points to an indirect block 93 that points to one or more additional data blocks 94, 95, etc. If the file 80 is so large that the indirect block 93 becomes full of block pointers, then the indirect block 88 will point to at least one more indirect block 96 that points to one or more additional data blocks 97, 98, etc.

If the file 80 is so large that the indirect block 88 becomes full of block pointers and its descendant indirect blocks are also full of block pointers, then the thirteenth entry of the block pointer array 83 contains a triple indirect block pointer BPA(12) to an indirect block 89 that points to an indirect block 99 that points to an indirect block 101 that points to one or more additional data blocks 102, 103, etc. If the file is so large that the indirect block 101 becomes full of pointers, then the indirect block 99 points to another indirect block 104 that points to one or more data blocks 105, 106, etc. If the file is so large that the indirect block 99 and its descendant indirect blocks are also full of pointers, then the indirect block 89 points to another indirect block 107 that points to yet another indirect block 108 that points to at least one data block 109, and so on. Once the indirect block 89 and its descendant indirect blocks become full of pointers, the file contains a maximum permitted number of data blocks.

For a very large file having a triple indirect block 89, the conventional mapping method shown in FIG. 2 may require four serial I/O operations to access a data block. For example, the first I/O operation is a read of the triple indirect block 89, the second is a read of the indirect block 107, the third is a read of the indirect block 108, and the fourth is a read or write to the data block 109.

In general, increases in the sizes of storage systems have allowed for the creation of extremely large data files. Random (or at least non-sequential) I/Os to these larger files causes a performance decrease when there are multiple levels of mapping between the inode 81 of the file and the data blocks of the file. Because file sizes are expected to grow, the conventional mapping method shown in FIG. 2 will likely result in an ever increasing performance impact. Therefore, the use of extents of indirect blocks for file mapping, as further described below, will improve performance immediately for very large files, and also prevent further degradation in the future as the average file size grows.

The use of extents of indirect blocks for file mapping also has the advantage that caching of the indirect blocks is more efficient. The fact that the extents of indirect blocks consist of only leaf-level indirect blocks means that a similar amount cache space will contain more actual mappings to data blocks than the caching of indirect blocks from files that use a tree of indirect blocks for file mapping.

Figure 3:
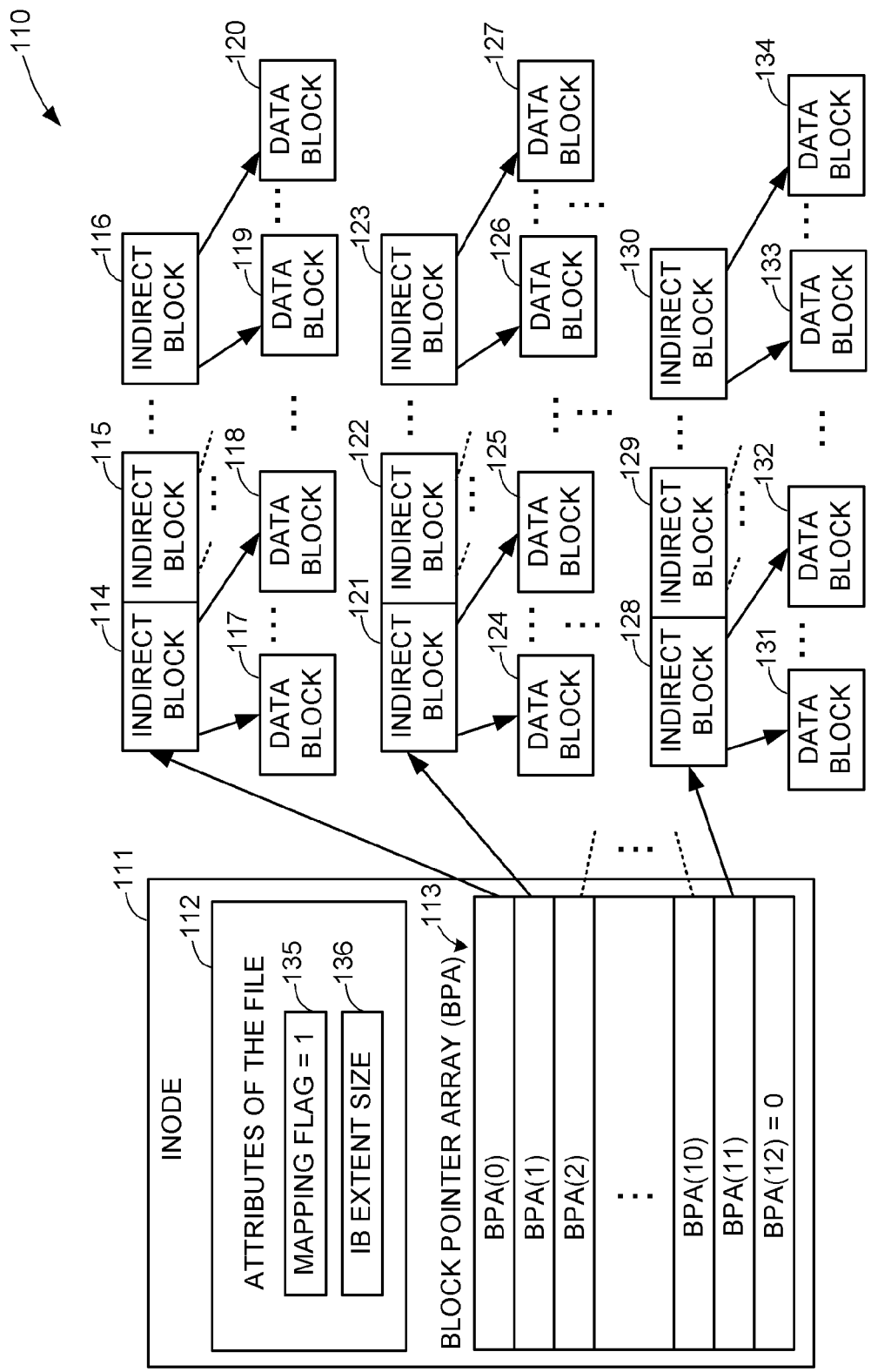
FIG. 3 is a block diagram of a file using extents of indirect blocks for file mapping.

FIG. 3 shows a file 110 using extents of contiguous indirect blocks for file mapping. The file 110 includes an inode 111 having file attributes 112 and a block pointer array 113. The file attributes 112 include a mapping flag 135 set to one to indicate that the file is using extents of indirect blocks for file mapping. The file attributes 112 also include an indirect block (IB) extent size 136 indicating the number of indirect blocks in each extent of indirect blocks that provide the file mapping metadata for the file 110. Each block pointer in the block pointer array 113 points to a respective extent of the indirect blocks, or if a block pointer has a value of zero (such as BPA(12)), then there is a hole (i.e., data having a value of zero) at the corresponding range in the logical extent of the file, or else the block pointer is not needed for mapping the file because the size of the file is less than the maximum size that can be mapped using extents of indirect blocks of the IB extent size 136.

For example, the first block pointer (BPA(0)) in the block pointer array 113 points to the first indirect block 114 of an indirect block extent also including the indirect block 115 and a last indirect block 116. The first indirect block 114 includes a first block pointer to a first data block 117 and a last block pointer to a data block 118. In a similar fashion, the last indirect block 116 includes a first block pointer to a data block 119 and a last block pointer to a last data block 120. Any block pointer in any of the indirect blocks may have a value of zero, indicating that there is a hole (i.e., data having a value of zero) at the corresponding block of the logical extent of the file. Therefore sparse allocation of the data blocks is supported by the extents of indirect blocks for file mapping. The data blocks can be allocated when the file is created or extended, or the data blocks can be allocated on demand when data is written to the data blocks.

The second block pointer (BPA(1)) in the block pointer array 113 points to a first indirect block 121 of an extent of indirect blocks including a second indirect block 122 and a last indirect block 123. The first indirect block 121 has a first block pointer pointing to a first data block 124, and a last block pointer pointing to a data block 125. The last indirect block 123 has a first block pointer pointing to a data block 126, and a last block pointer pointing to a last data block 127.

The twelfth block pointer (BPA(11)) in the block pointer array 113 points to a first indirect block 128 of an extent of indirect blocks including a second indirect block 129 and a last indirect block 130. The first indirect block 128 has a first block pointer pointing to a first data block 131, and a last block pointer pointing to a data block 132. The last indirect block 130 has a first block pointer pointing to a data block 133, and a last block pointer pointing to a last data block 134.

When a request is made to access a data block at a specified offset within the logical extent of the file, either for reading or writing, the file system manager determines the logical block address of the data block at the specified offset. The file system manager does this by determining an index into the block pointer array 113 based on the specified offset and the IB extent size 136, and then reading the indexed block array pointer from the block pointer array 113, and then using the indexed block array pointer to read the data block pointer from one of the indirect blocks in the extent of indirect blocks indicated by the indexed block pointer from the block pointer array. If the indirect block of interest is not already cached, then it will be read from the data storage. Therefore the data block address is obtained after no more than one I/O operation upon the data storage.

Figure 4:
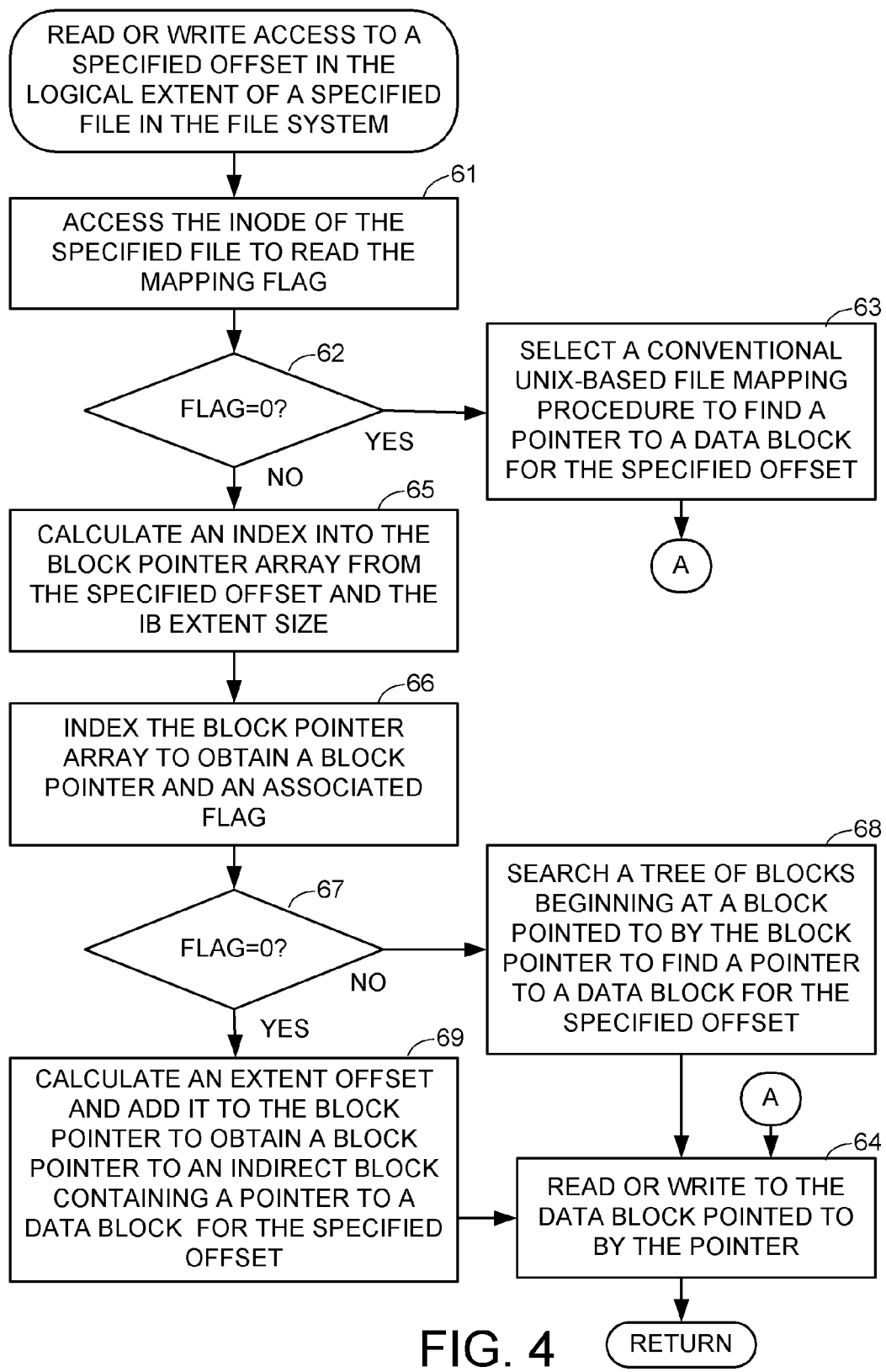
FIG. 4 is a flowchart of a procedure for read or write access to a file in the file system introduced in FIG. 1.

FIG. 4 shows a procedure for read or write access to a specified file in the file system, for a more general case in which the file may have the format of FIG. 2, or the file may have the format of FIG. 3, or the file may be a snapshot copy as further described below with reference to FIG. 8. In a first step 61 in FIG. 4, the file system manager accesses the inode of the specified file to read the mapping flag. If the mapping flag is not set, as tested in step 62, then execution branches to step 63 to select a conventional UNIX-based file mapping procedure to find a pointer to a data block for the specified offset. Then, in step 64, the file system manager performs a read or write to the data block pointed to by the pointer, and execution returns.

In step 62, if the mapping flag is set, then execution continues to step 65. In step 65, an index into the block pointer array in the inode is calculated from the specified offset and the IB extent size in the inode. For example, if the specified offset is in bytes, then the specified offset in blocks is calculated by dividing the specified offset in bytes by the block size in bytes. Then the block pointer array index is calculated by dividing the specified offset in blocks by the product of the indirect block extent size in blocks and the number of data block pointers in each indirect block. In step 66, the file system manager indexes the block pointer array in the inode to obtain a block pointer and an associated flag. In step 67, if the flag is not zero, then execution branches to step 68. In step 68, the file system manager searches a tree of blocks beginning at a block pointed to by the block pointer to find a pointer to a data block for the specified offset. Execution continues to step 64 to read or write to the data block pointed to by the pointer, and execution returns.

In step 67, if the flag is equal to zero, then execution continues to step 69. In step 69, a pointer to the indirect block of interest in the extent is calculated from the indexed block pointer in the block pointer array plus an extent offset, and a pointer to the data block for the specified offset in the file is obtained from the indirect block of interest. For example, the file offset in blocks corresponding to the first indirect block in the extent is the product of the block pointer array index and the IB extent size in blocks and the number of data block pointers in each indirect block. The extent offset is calculated by computing the difference between the specified offset in blocks and the file offset in blocks corresponding to the first indirect block in the extent, and dividing this difference by the number of data block pointers in each indirect block. The data block pointer index in the indirect block of interest is the remainder of an integer division of the specified offset in blocks and the number of data block pointers in each indirect block. Execution continues from step 69 to step 64 to read or write to the data block pointed to by the data block pointer, and execution returns.

Figure 5:
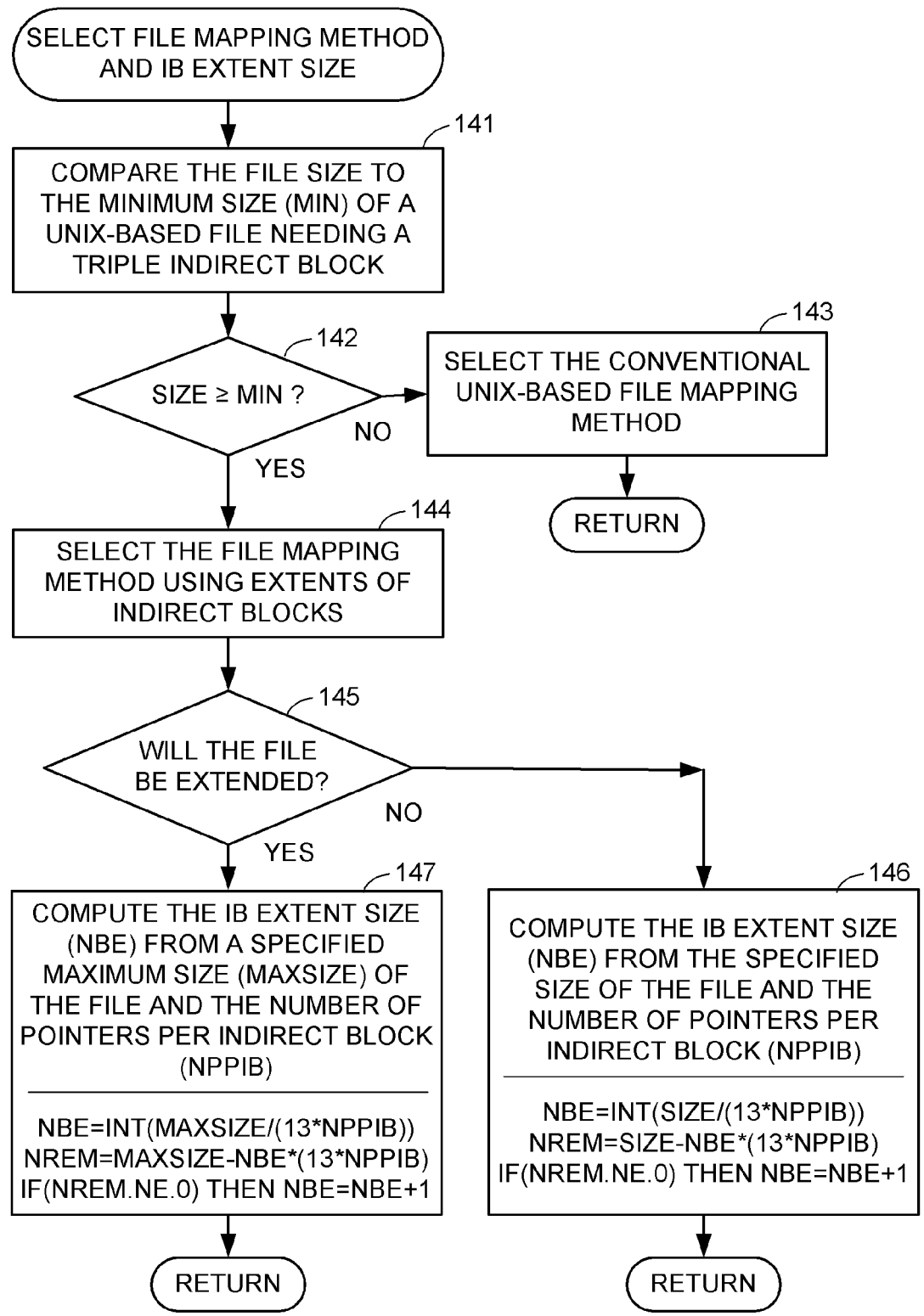
FIG. 5 is a flowchart of a procedure for selecting a file mapping method and an indirect block extent size for a new file in the file system introduced in FIG. 1.

FIG. 5 shows a procedure for selecting a file mapping method for a file in the file system, and for selecting an indirect block extent size when the selected file mapping method is the use of extents of indirect blocks. In general, the use of extents of indirect blocks for file mapping is advantageous when the file size is at least a certain threshold size. For example, when the alternative mapping method is an indirect block tree in accordance with a Unix-based file system, the use of extents of indirect blocks for file mapping is advantageous when the file size would require that a triple indirect block would be needed for the indirect block tree. Therefore, in a first step 141, the file size is compared to the minimum size of a UNIX-based file needing a triple indirect block. In step 142, if the file size is not greater than or equal to this minimum size, then execution branches to step 143 to select the conventional UNIX-based file mapping method, and execution returns.

In step 142, if the file size is greater or equal to the minimum size, then execution continues to step 144. In step 144, the file mapping method using extents of indirect blocks is selected. In step 145, if the file will not be extended, then execution branches to step 146. In step 146, the indirect block extent size is computed from the specified size of the file and the number of data block pointers per indirect block, so that the file mapping metadata will include thirteen extents of indirect blocks and each of the extents will include the same number of indirect blocks. This will result in the use of all of the block pointers in the block pointer array of the inode for the file so that the indirect block extent size will be a minimum size for the specified file size. For example, the number of blocks in each extent is computed by an integer division of the specified file size in blocks by the product of thirteen times the number of data block pointers per indirect block. A remainder of this integer division is computed as the difference between the specified file size in blocks and the number of blocks in each extent times thirteen times the number of data block pointers per indirect block. If this remainder is not zero, then the number of blocks in each extent is incremented by one. Execution returns after step 146.

In step 145, if the file will be extended, then execution continues to step 147. In step 147, the indirect block extent size is computed from a specified maximum size of the file and the number of pointers per indirect block, so that when the file has been extended to the specified maximum size, the file mapping metadata for the file will include thirteen extents of indirect blocks and each of the extents will include the same number of indirect blocks. For example, the number of blocks in each extent is computed by an integer division of the maximum file size in blocks by the product of thirteen times the number of data block pointers per indirect block. A remainder of this integer division is computed as the difference between the maximum file size in blocks and the number of blocks in each extent times thirteen times the number of data block pointers per indirect block. If this remainder is not zero, then the number of blocks in each extent is incremented by one. Execution returns after step 147.

Figure 6:
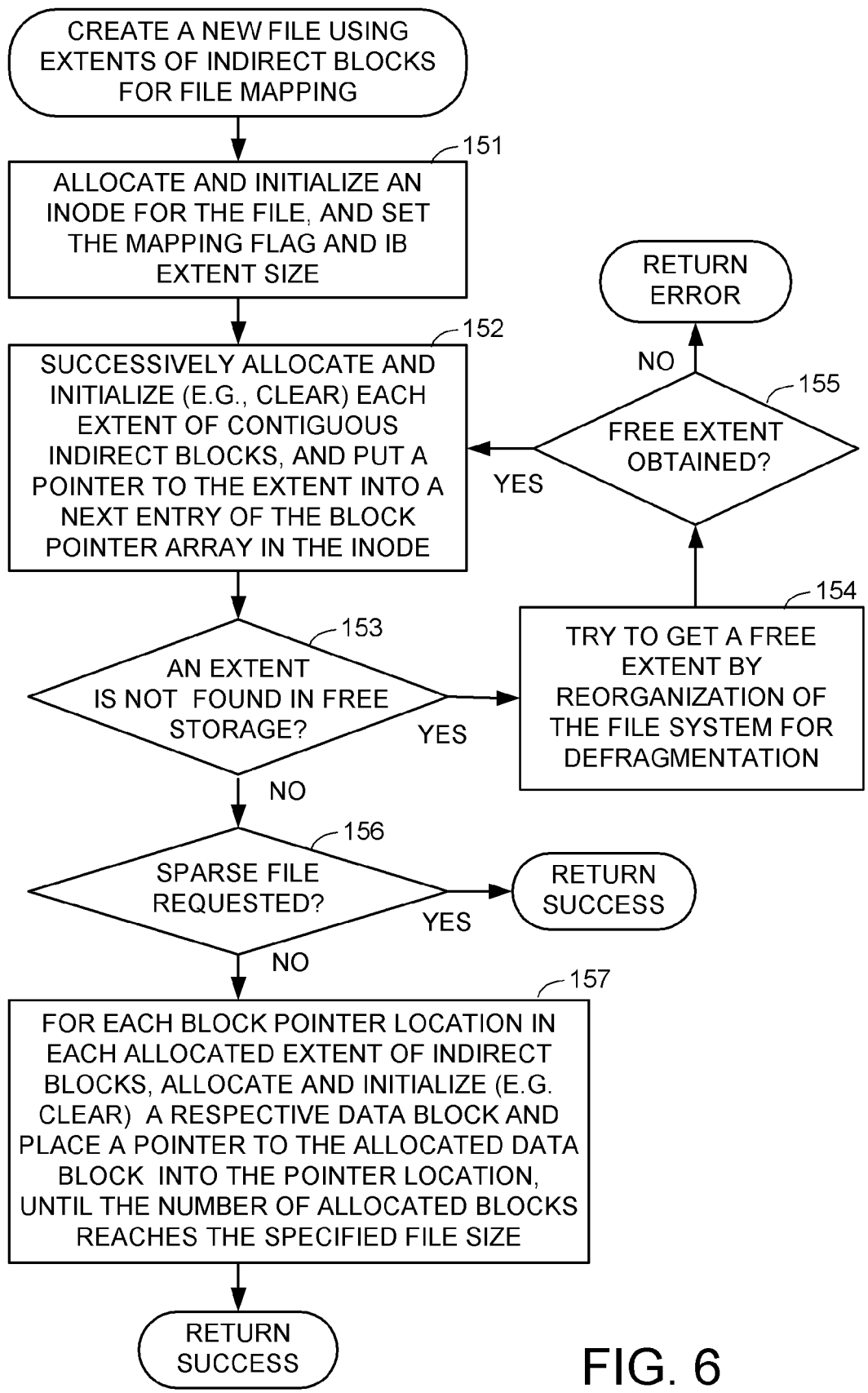
FIG. 6 is a flowchart of a procedure for creating a new file using extents of indirect blocks for file mapping.

FIG. 6 shows a procedure for creating a new file using extents of indirect blocks for file mapping. In a first step 151, an inode for the file is allocated and initialized by setting the mapping flag and the indirect block extent size (as determined in step 146 or 147 in FIG. 5). Then, in step 152, each extent of contiguous indirect blocks is successively allocated and initialized by clearing each indirect block. A pointer to the extent is put into a next entry of the block pointer array in the inode.

In step 153, if any required extent of indirect blocks is not found in free storage for the file system, then execution branches to step 154 to reorganize the file system for defragmentation in an attempt to recover contiguous free storage. In step 155, if sufficient contiguous free storage has not been recovered to provide a required free extent, then execution returns with an error message indicating that the new file has not been created due to insufficient contiguous free storage. In this case the calling program could respond to the error message by invoking the conventional UNIX file mapping routine so that the file would be mapped by a tree of indirect blocks. Otherwise, if sufficient contiguous free storage has been recovered to provide a free extent, then execution loops back to step 152.

In step 153, if all required extents are found in free storage, then execution continues from step 153 to step 156. In step 156, if a sparse file has been requested, then execution returns. Otherwise, if a sparse file has not been requested, execution continues from step 156 to step 157. In step 157, for each block pointer location in each allocated extent of indirect blocks, a respective data block is allocated and initialized, and a pointer to the allocated data block is put into the block pointer location, until the number of data blocks reaches the specified file size in blocks. After step 157, execution returns.

For some applications, it is desired to make a series of snapshot copies from the same production file having extents of indirect blocks for file mapping. It is also desired to make the snapshot copies in such a way that the snapshot copies may share indirect blocks with each other and with the production file. For example, a method of making and keeping a series of snapshot copies in such a way that the snapshot copies may share indirect blocks with each other and with the production file is disclosed in in Bixby, et al. U.S. Pat. No. 7,555,504 issued Jun. 30, 2009, incorporated herein by reference. But the method disclosed in Bixby, et al. U.S. Pat. No. 7,555,504 does not retain the original indirect blocks in the production file when the file mapping metadata in these original indirect blocks is modified for the production file. Therefore the method disclosed in Bixby, et al. U.S. Pat. No. 7,555,504 requires modification when making a snapshot copy of a production file having the direct mapped file type.

For the case of a single snapshot copy of the production file, the method disclosed in Bixby, et al. U.S. Pat. No. 7,555,504 can be modified to retain an original indirect block in the production file by copying the content of the original indirect block to a newly allocated block before modifying a block pointer in the original indirect block, and modifying the snapshot copy by substituting a block pointer to the newly allocated block for the block pointer to the original indirect block. But when making and keeping a series of snapshot copies from the same production file, further difficulties arise in retaining an original indirect block in the production file because it is possible for more than one of the snapshot copies to share an original indirect block with the production file. In this case, when a block pointer in an original indirect block of the production file needs to be changed, each of the snapshot copies sharing the original block with the production file should be modified to substitute the newly allocated indirect block for the original indirect block. But this would appear to require a search in at least each of the snapshot copies that are sharing the original indirect block to discover where in each snapshot copy one would find the pointer to the original block.

The present invention provides a way of making a series of snapshot copies of a production file while modifying a block pointer in an original indirect block of the production file that is shared with more than one of the snapshot copies and keeping the original indirect block in the production file without searching more than one of the snapshot copies sharing the original indirect block for substituting a newly allocated indirect block for the original indirect block in each of the snapshot copies. This is done by using virtual pointers into the maps of the snapshots. This preserves the ability to use large extents of contiguous indirect blocks in the production file while allowing changes to be made and the maps to be shared at a much smaller, file system block granularity.

The term "virtual pointer" means a pointer that does not appear in the indirect block tree of a conventional file, such as a UNIX-based file or a file using a B-tree of indirect blocks. A preferred location for the virtual pointers is just above the leaf-level indirect blocks in the production file. Before any two snapshots of the production file share a leaf-level indirect block of the production file, a map of free virtual pointer objects 163 is accessed to allocate a virtual pointer object, and the allocated virtual pointer object is linked to the leaf-level indirect block so that a virtual pointer in the virtual pointer object points to the leaf-level indirect block. In this fashion, two or more snapshots may share the leaf-level indirect block by sharing the virtual pointer object.

In a preferred implementation, when the snapshot copy facility writes new data to a specified data block of the production file and this specified data block is mapped to the production file by the shared leaf-level indirect block, the new data is written to a newly allocated file system data block and the original leaf-level indirect block is kept in the production file. The original data block is kept in any and all of the snapshots that shared this original data block by allocating a new leaf-level indirect block and changing a virtual pointer to point to the newly-allocated leaf-level indirect block. The contents of the original leaf-level indirect block are copied to the newly allocated leaf-level indirect block before the contents of the original leaf-level indirect block are updated to change a block pointer to point to the newly allocated file system data block.

In an alternative implementation, when the snapshot copy facility writes new data to a specified data block of the production file and the specified data block is mapped to the production file by the shared leaf-level indirect block, a new file system data block is allocated, the original data of the specified data block is copied from the specified data block in the production file to the newly allocated file system data block, and then the new data is written to the specified data block of the production file. The original data block is kept in any and all of the snapshots that shared this original data block by allocating a new leaf-level indirect block and changing the virtual pointer to point to the newly-allocated leaf-level indirect block. The contents of the original leaf-level indirect block are copied to the newly allocated leaf-level indirect block and then the contents of the newly allocated leaf-level indirect block are updated to change a block pointer to point to the newly allocated file system data block. This alternative arrangement preserves not only the leaf-level indirect block allocations of the production file but also the file system data block allocations of the production file. This alternative arrangement, however, has an additional step of copying the original data from the file system data block allocated to the production file to the newly allocated file system data block for the snapshot copies. Therefore this alternative arrangement is not preferred unless this additional data copy step is justified by an overriding desire to preserve the file system data block allocations of the production file. This could be the case for certain applications in which the file system data blocks are allocated to the production file is large contiguous extents and sequential access would be used for streaming data from the production file at a high rate in a continuous fashion from one of the large contiguous extents.

Figure 7:
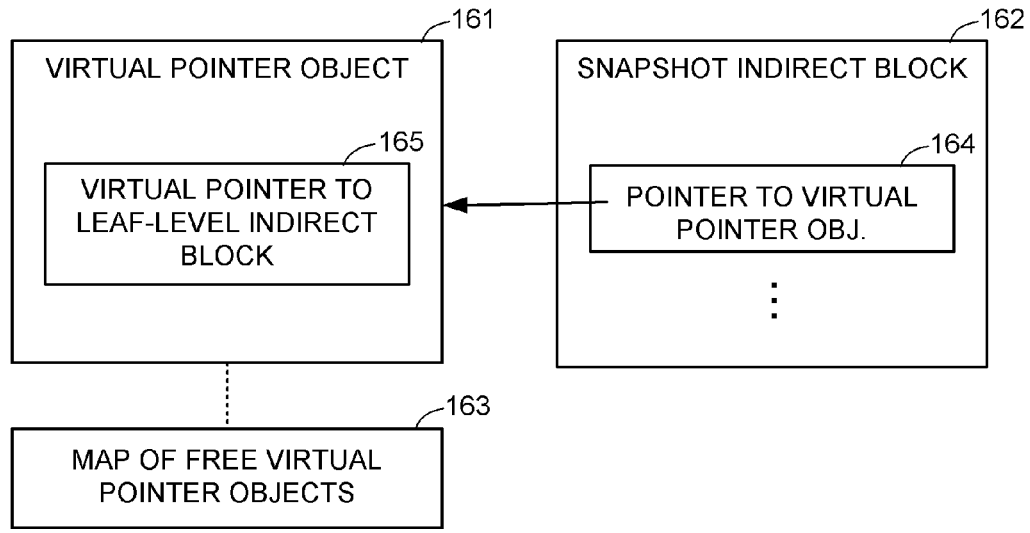
FIG. 7 is a block diagram showing a virtual pointer object and an associated map of free virtual pointer objects and a snapshot indirect block using the virtual pointing object.

FIG. 7 shows a specific example of a virtual pointer object 161 and its relationship with a snapshot indirect block 162 and a map of free virtual pointer objects 183. The snapshot indirect block 162 includes many more pointer fields than the one pointer field 164 shown in FIG. 7. The pointer field 164 includes a pointer to the virtual pointer object 161. The virtual pointer object 161 includes a virtual pointer 165 to a leaf-level indirect block. The virtual pointer object 161 was allocated dynamically from memory or storage when needed by accessing a map 163 of free virtual pointer objects. The map 163 of free virtual pointer objects may use whatever mechanism is used for management of the file system cache (37 in FIG. 1) to keep track of whether a page is in use. Free virtual pointer objects can be indicated in a bitmap or linked together in a chain.

The block hierarchy of each snapshot provides a way of determining whether a pointer in a snapshot indirect block is either pointing to a virtual pointer object or is pointing to another indirect block. One way of doing this is for all of the valid pointers in each snapshot indirect block at a certain level of the block hierarchy to be pointers only to virtual pointer objects. For example, the certain level is a constant level (such as either the second or third level) below the inode. Alternatively, the hierarchy could be the same as for a UNIX-based file except that a virtual pointer object is inserted just above each leaf-level indirect block in each snapshot.

It is also possible for the contents of each pointer field in a snapshot indirect block to indicate whether the pointer in the pointer field is pointing to either a virtual pointer object or another indirect block. This method would be unaffected by dynamic changes in the number of levels between the snapshot inode and the leaf-level indirect blocks, as may occur when the indirect block hierarchy is a B-tree. One way of implementing this method is to include a flag in each block pointer field to indicate whether the pointer is pointing to either a virtual pointer object or another indirect block.

Another way of implementing this method is for the file system to dedicate one range of block pointer values to indirect blocks and another range of block pointer values to other kinds of file system blocks. In this case, a comparison of the block pointer value to a range limit indicates whether the pointer in the pointer field of a snapshot indirect block is a pointer to a virtual pointer object or a pointer to an indirect block. For example, the pointers to the virtual pointer objects are file system block numbers of file system blocks that are not indirect blocks, and such a file system block number is offset by a constant and then used as an index into a region of the file system storage allocated to the virtual pointer objects in order to access the corresponding virtual pointer. The following description, however, will assume that the virtual pointers are used at a certain level in the indirect block hierarchy of each snapshot.

It is possible for the block pointers and virtual pointers in each snapshot to have associated owner flags or reference counters to control the sharing an un-sharing of the virtual pointer objects, indirect blocks, and data blocks. The use of owner flags in association with snapshots is disclosed in in Bixby, et al. U.S. Pat. No. 7,555,504. Such an owner flag when set indicates that the indirect block is in the oldest of any snapshot copies sharing the block. Such an owner flag when not set indicates that the pointed-to block is shared and the indirect block is not in the oldest snapshot copy sharing the block. The use of reference counters to control the sharing and un-sharing of file system blocks of snapshots and de-duplicated files is disclosed in Armangau et al. U.S. Pat. No.

8,032,498 B1 issued Oct. 4, 2011, incorporated herein by reference. The following description, however, will describe how to practice the present invention without using owner flags or reference counters.

Figure 8:
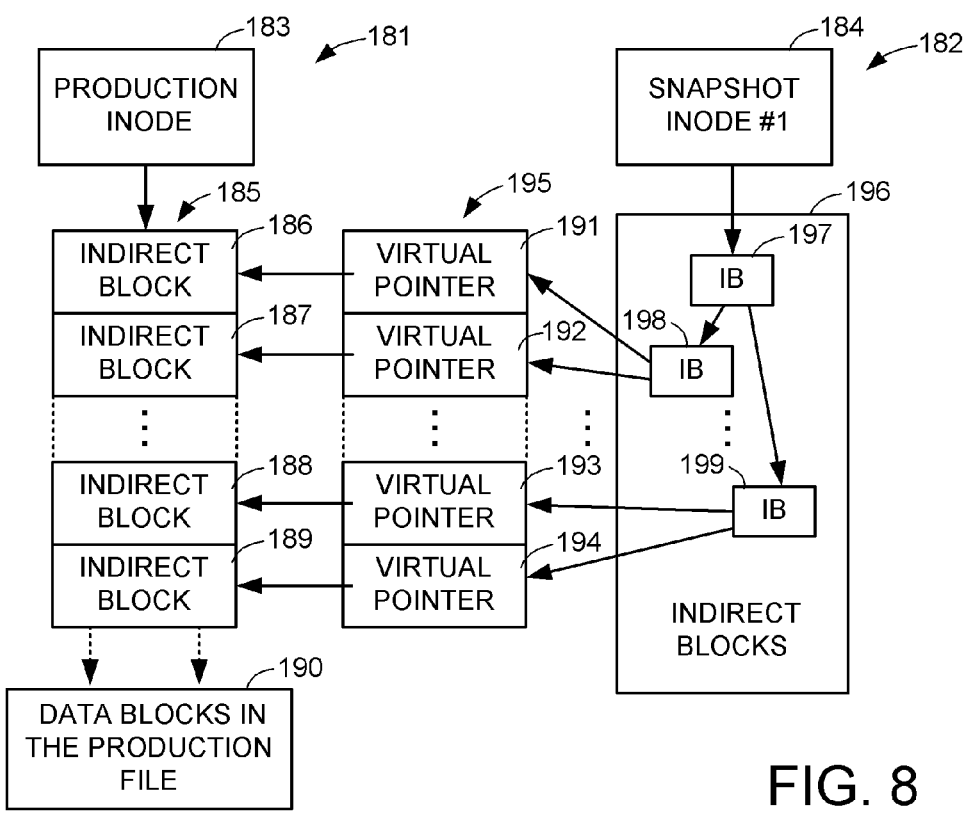
FIG. 8 is a block diagram showing a production file and a snapshot copy of the production file.

FIG. 8 shows a preferred organization of a first snapshot 182 of a production file 181. The production file 181 has an inode 183 and an extent 185 of contiguous leaf-level indirect blocks 186, 187, 188, and 189. In response to a request to create the first snapshot 182 of the production file 181, the snapshot facility (38 in FIG. 1) suspends client read/write access to the production inode 183, waits for any pending write access upon the production file to complete, allocates an inode 184 for the snapshot, copies the contents of the production inode 183 to the snapshot inode 184, and resets the block pointers in the snapshot inode 184 to indicate that these block pointers are invalid. Then the snapshot copy facility begins a background process of building a tree of indirect blocks 196 between the snapshot inode 184 and the leaf-level indirect blocks 185 of the production file, and resumes client read/write access to the production file 181. However, any further write access is handled by the snapshot copy facility in such a way that when a specified data block of the production file 181 is accessed for a write operation, the indirect mapping of the snapshot 182 is accessed to complete, on a priority basis, the indirect mapping from the snapshot inode 184 to the specified data block.

This background process builds the tree 196 so that when completed, the tree 196 provides an indirect file mapping for the entire snapshot 182, and this indirect file mapping includes virtual pointers 195 at a level just above the leaf-level indirect bocks 185. For example, except for the virtual pointers 195, the indirect file mapping is in accordance with a UNIX-based file or in accordance with a B-tree index for finding the leaf-level indirect block for a specified file offset. Once the background process is finished building the tree 196 for the first snapshot 182 and linking this tree 196 via virtual pointers 195 to the leaf-level indirect blocks 185, the snapshot copy facility may create a second snapshot copy of the production file.

Figure 9:
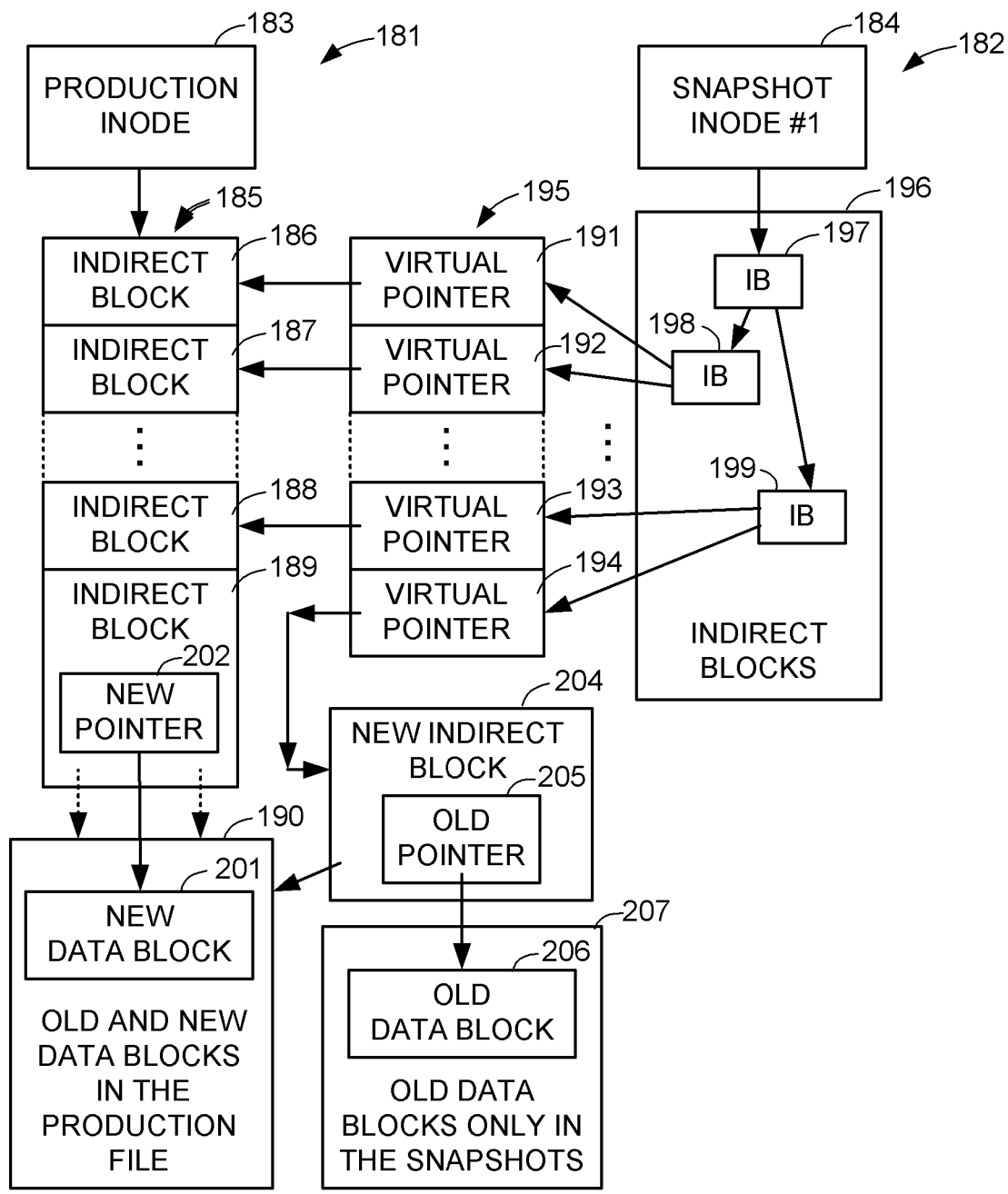
FIG. 9 is a block diagram showing the production file and the snapshot copy of FIG. 9 after a block of new data has been written to the production file.

FIG. 9 shows the production file 181 and the first snapshot 182 after the snapshot copy facility has written a block of new data from a client to the production file 181. In response to a client request to write a block of new data to a specified block offset in the production file 181, the snapshot copy facility determines whether a write has already been performed to the specified block offset since the creation of the most recent snapshot by determining whether the indirect mapping of the most recent snapshot maps the specified offset to the same data block as the direct mapping from the production inode. If not, then the production file does not share its present file system data block at the specified offset with any present snapshot of the production file, so that the write operation is completed by writing the block of new data to the file system data block of the production file.

For the case of FIG. 9, the production file 183 shared its old data block 206 at the specified offset with the first snapshot 182. Therefore, the snapshot copy facility allocated a new file system data block 201 to receive the block of new data from the client, and wrote the block of new data to this newly allocated data block. The snapshot copy facility also found that the old pointer 205 to this old data block 206 was in the indirect block 189 shared between the production file 181 and the snapshot 182. Therefore the snapshot copy facility allocated a new indirect block 204 and copied the contents of the original indirect block 189 to the new indirect block, before setting a new pointer 202 in the original indirect block 189, so that the new pointer 202 points to the newly allocated data block 201.

Figure 10:
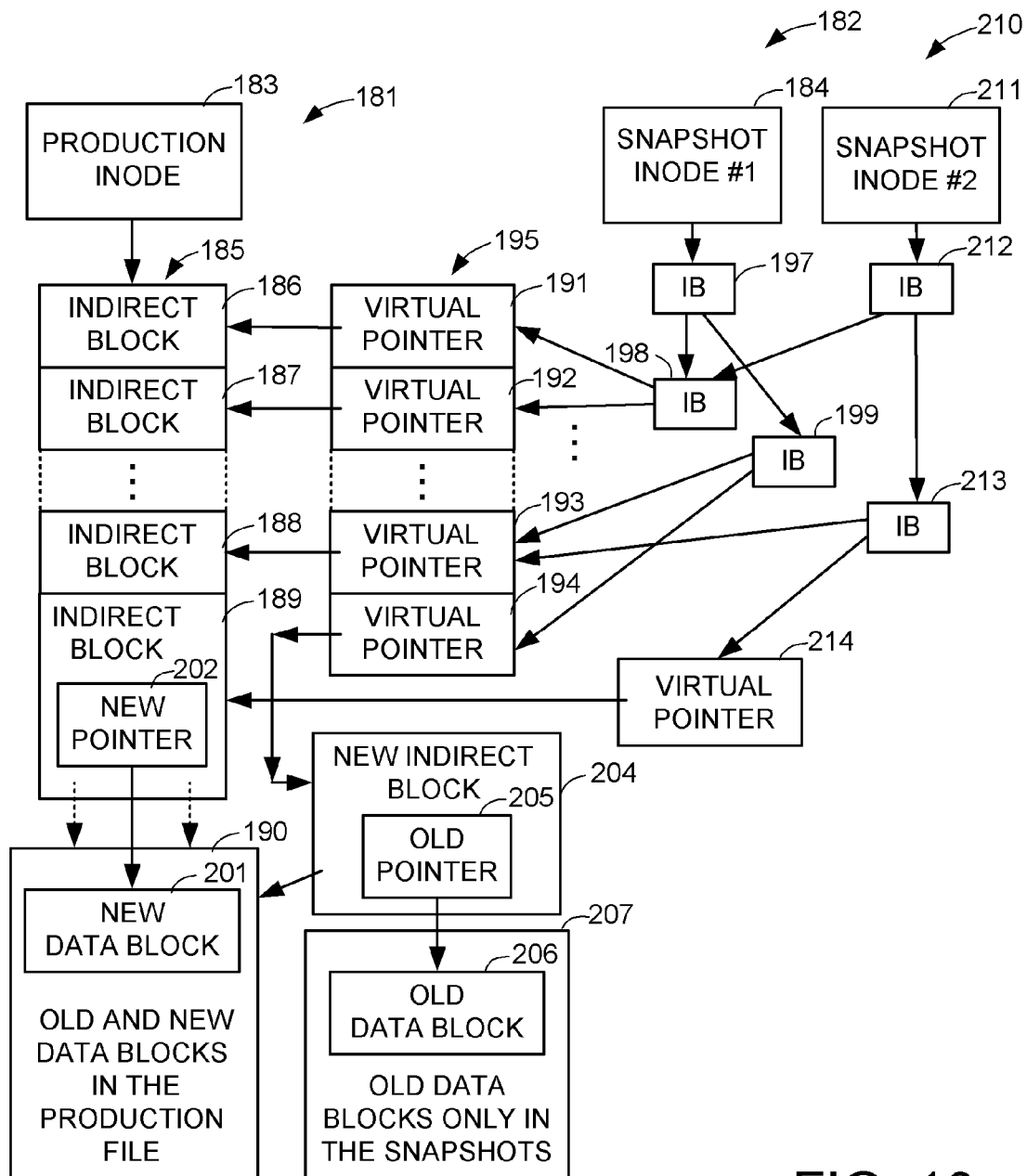
FIG. 10 is a block diagram showing the production file and the snapshot copy of FIG. 9 after creation of a second snapshot copy of the production file.

FIG. 10 shows the production file 183 and the first snapshot copy 184 of FIG. 9 after creation of a second snapshot copy 210 of the production file. The process of creating the second snapshot copy 210 included allocating a second snapshot inode 211, indirect blocks 212, 213, and a virtual pointer object 214 including a virtual pointer pointing to the indirect block 189. The second snapshot copy 210 shares the indirect block 198 (and all of the descendants of the indirect block 198) with the first snapshot copy 182.

In general, creation of a second or subsequent snapshot involves suspending read-write access to the production file, allowing any pending write operation upon the production file to complete, allocating an inode for the new snapshot, copying the contents of the production inode to the inode of the new snapshot, resetting the block pointers in the inode of the new snapshot, and then resuming read-write access to the production file.

Figure 11:
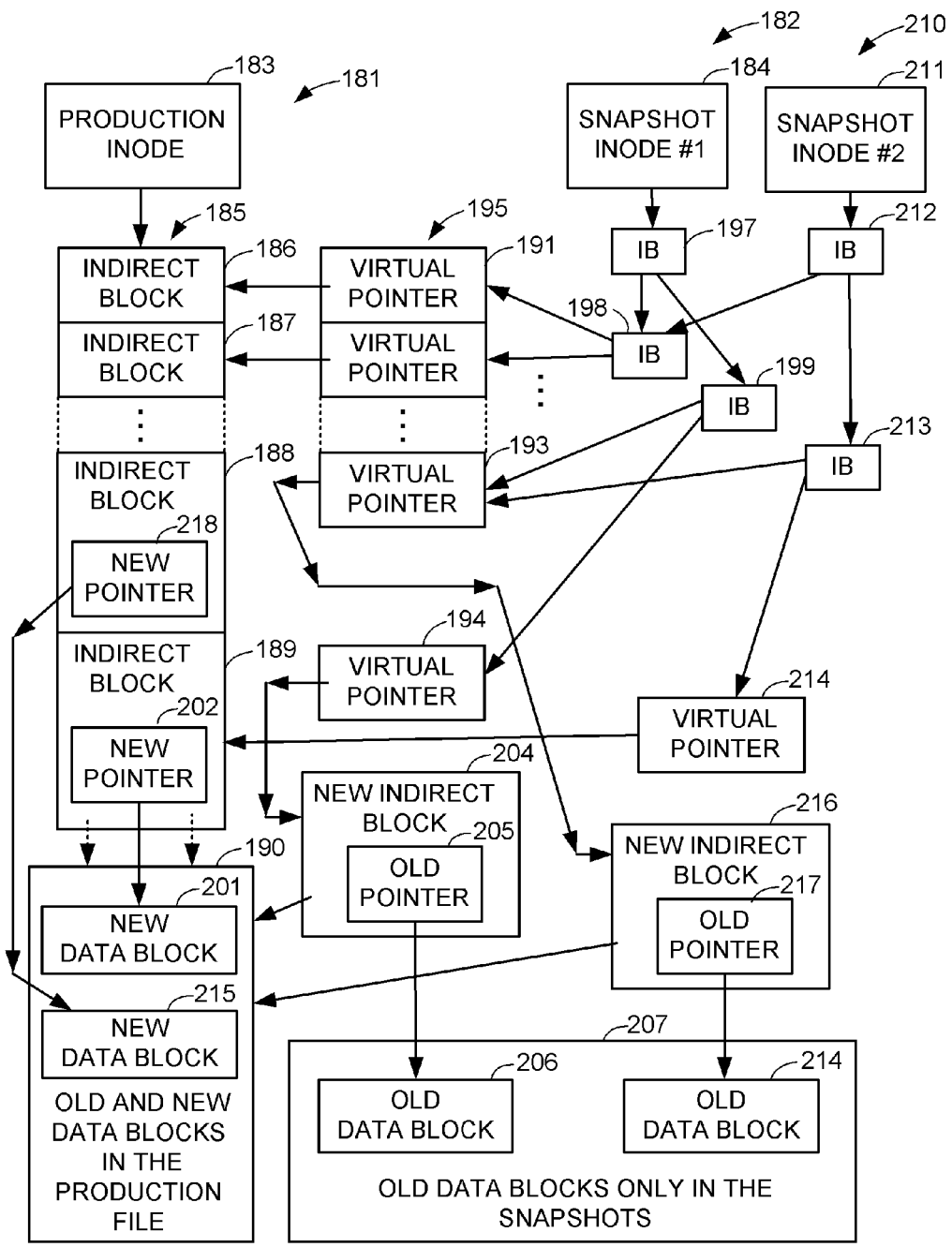
FIG. 11 is a block diagram showing the production file and snapshots of FIG. 10 after a second new data block has been written to the production file.

FIG. 11 shows the production file 181 and the two snapshots 182, 210 of FIG. 10 after a write operation to the production file. In this case the snapshot copy facility responds to a second client write request for writing new data to a specified block offset in the production file by finding that the most recent snapshot copy 210 shares the file system data block 214 at the specified block offset with the production file 181. Therefore the snapshot copy facility allocates a new file system data block 215 and writes the new data to this newly allocated data block 215. Also a new leaf-level indirect block 216 is allocated, the contents of the corresponding leaf-level indirect block 188 are copied to the newly allocated leaf-level indirect block 216, including an old pointer 217 pointing to the old data block 214, and then a new pointer 218 to the newly-allocated data block 215 is written to the old leaf-level indirect block 188. Moreover, the virtual pointer 193 is changed to point to the newly allocated leaf-level indirect block 216 rather than the corresponding old leaf-level indirect block 188 mapping the specified block offset in the production file.

FIG. 11 illustrates that by changing the virtual pointer 183 to the newly-allocated leaf-level indirect block 216, the old data block 214 is kept in more than one of the snapshot copies 182, 210 while the corresponding old leaf-level indirect block is kept in the production file 181 and changed to include a new pointer 218 to the new data block 215. The write operation required traversal of the indirect block tree of just the most recent snapshot 211. In general, the time for performing such a write operation to a data block shared among the production file and multiple snapshot copies of the production file does not depend on the number of snapshot copies that share the data block.

Figure 12:
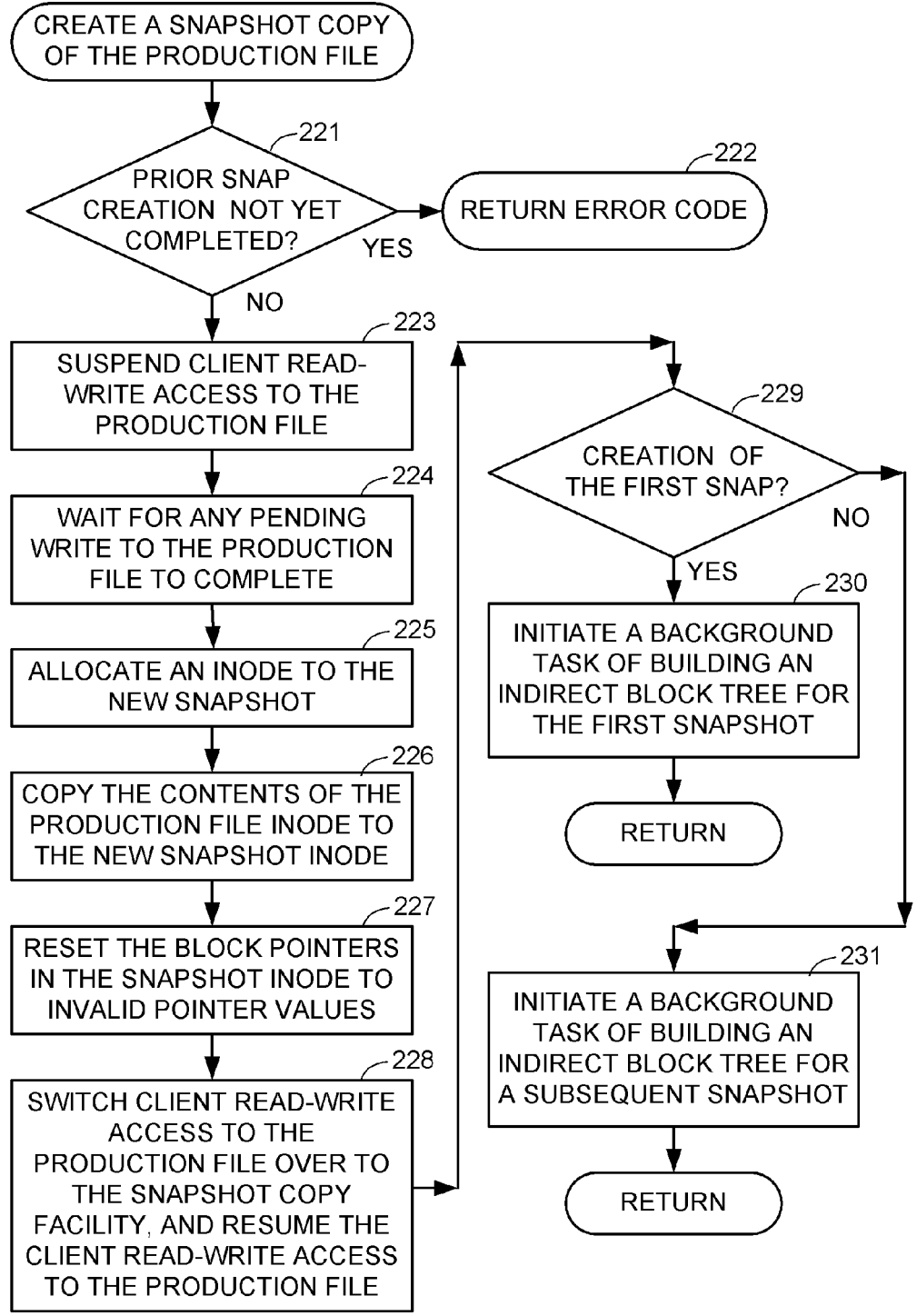
FIG. 12 is a flowchart of a procedure for creating a snapshot copy of a production file.
Figure 17:
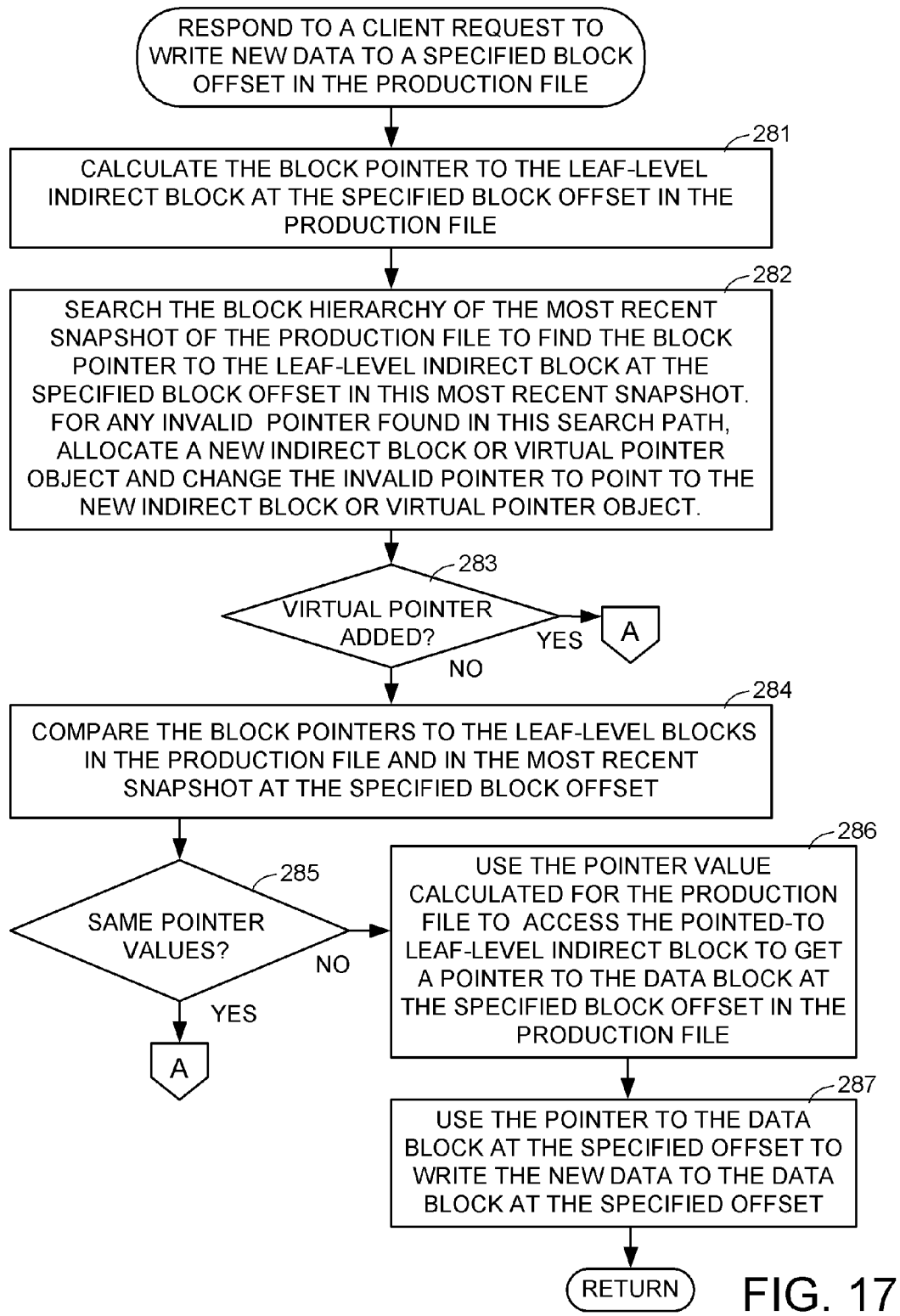
FIGS. 17 and 18 together comprise a flowchart of a procedure for responding to a client request to write new data to a specified block offset in the production file.

FIG. 12 shows a procedure for creating a snapshot copy of the production file. In a first step 221, if a previous instance of this process of creating a snapshot of the production file has not yet completed, then execution returns an error code in step 222. Otherwise, execution continues from step 221 to step 223. In step 223, client read-write access to the production file is suspended. In step 224, the snapshot creation process waits for any pending write operations upon the production file to complete. Then in step 225, an inode is allocated to the new snapshot. In step 226, the contents of the production file inode are copied to the new snapshot inode. In step 227, the block pointers in the new snapshot inode are reset to indicate invalid pointer values. Such an invalid pointer value in a block pointer field indicates that a branch of the snapshot tree corresponding to the block pointer field has not been built yet. In step 228, client read-write access to the production file is switched over to the snapshot copy facility, and client read-write access to the production file is resumed, so that client write requests upon the production file are handled as shown in FIG. 17, as further described below.

In step 229, if there are no other snapshots of the production file presently sharing any blocks of the production file, then the procedure of FIG. 12 is creating a first snapshot of the production file, and execution continues to step 230. In step 230, a background task is initiated to build an indirect block tree for the first snapshot, as further described below with reference to FIG. 13, and then execution returns.

In step 229, if there already is at least one snapshot of the production file sharing blocks of the production file, then execution branches from step 229 to step 231. In step 231, a background task is initiated to build an indirect block tree for this subsequent snapshot, as described below with reference to FIG. 15, and then execution returns.

Figure 13:
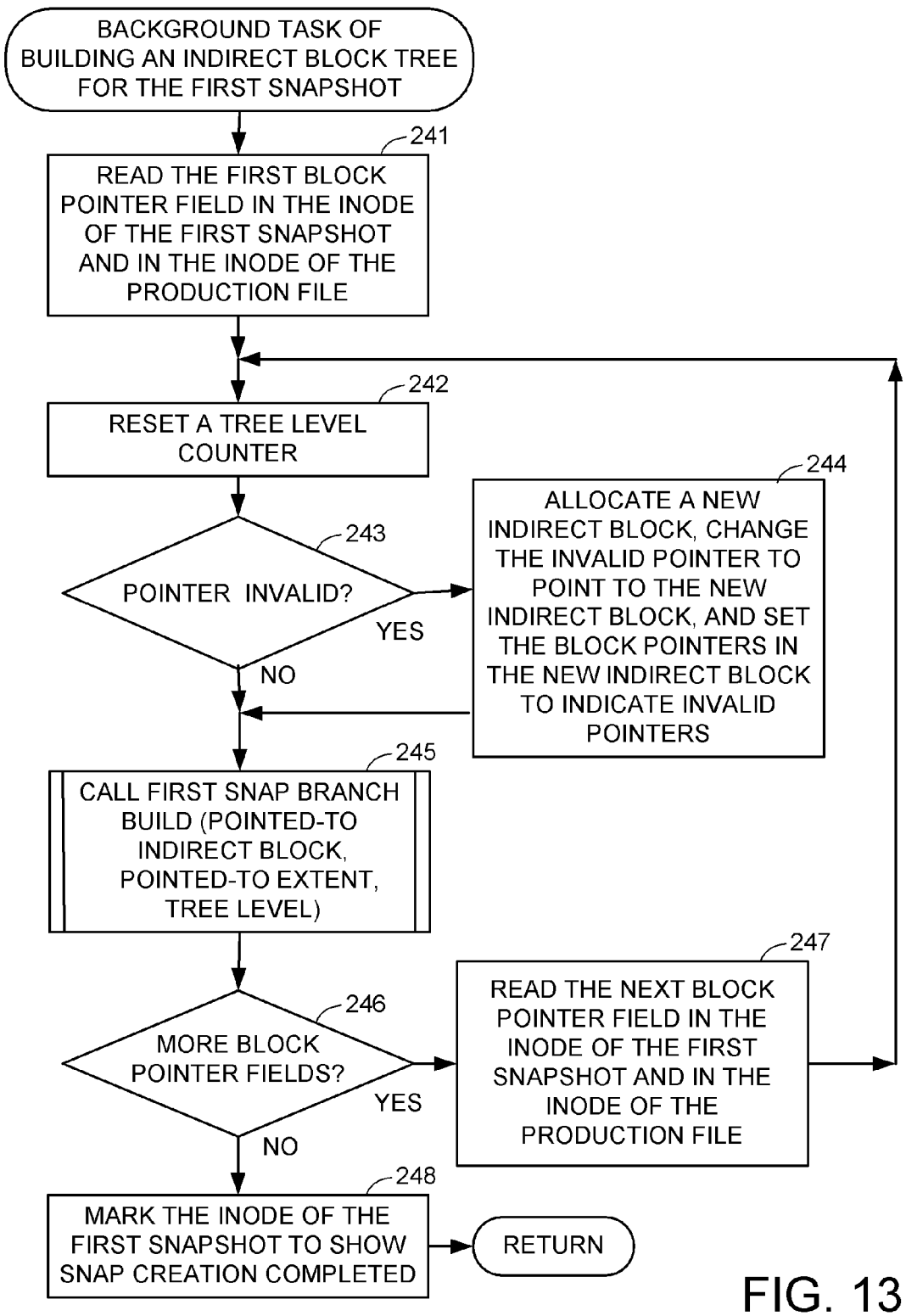
FIG. 13 is a flowchart of a background task of building an indirect block tree for a first snapshot.

FIG. 13 shows the background task of building an indirect block tree for a first snapshot. In a first step 241, the first block pointer field is read in the inode of the first snapshot and in the inode of the production file. In step 242, a tree level counter is reset. This tree level counter is used to indicate levels in the indirect block hierarchy of the first snapshot. For example, in the hierarchy of FIG. 8, the indirect block 197 is at level 0, and the indirect blocks 198, 199 are at level 1, so that the pointers in the block pointer fields in the indirect blocks 198, 199 at level 1 are either invalid or point to respective ones of the virtual pointer objects 195.

In step 243, if the block pointer in the snapshot inode is invalid, then execution branches to step 244. In step 244, a new indirect block is allocated, the invalid block pointer is changed to point to this new indirect block, and the block pointers in this new indirect block are set to indicate invalid pointers. Execution continues from step 244 to step 245. Execution also continues from step 243 to step 245 to call a recursive subroutine to build a branch of the snapshot from the indirect block pointed to by the pointer now in the present block pointer field of the snapshot inode, and to link this branch with the corresponding extent of leaf-level indirect blocks unless these leaf-level indirect blocks change first as a result of client write operations upon the production file since the point-in-time of the snapshot (i.e., since the time of steps 225 to 227 in FIG. 12). Any client write operations upon the production file during the processing of the background task of FIG. 13 will interrupt the processing of this background task. Execution continues from step 245 to step 246.

In step 246, if there are more block pointer fields in the snapshot inode, then execution branches to step 247. In step 247, the next block pointer field is read in the first snapshot and in the inode of the production file. Execution loops from step 247 back to step 242.

In step 246, once there are no more block pointer fields of the snapshot inode from which to build new branches, execution continues to step 248. In step 248, the inode of the first snapshot is marked to show that the snapshot creation has been completed, and then execution returns.

Figure 14:
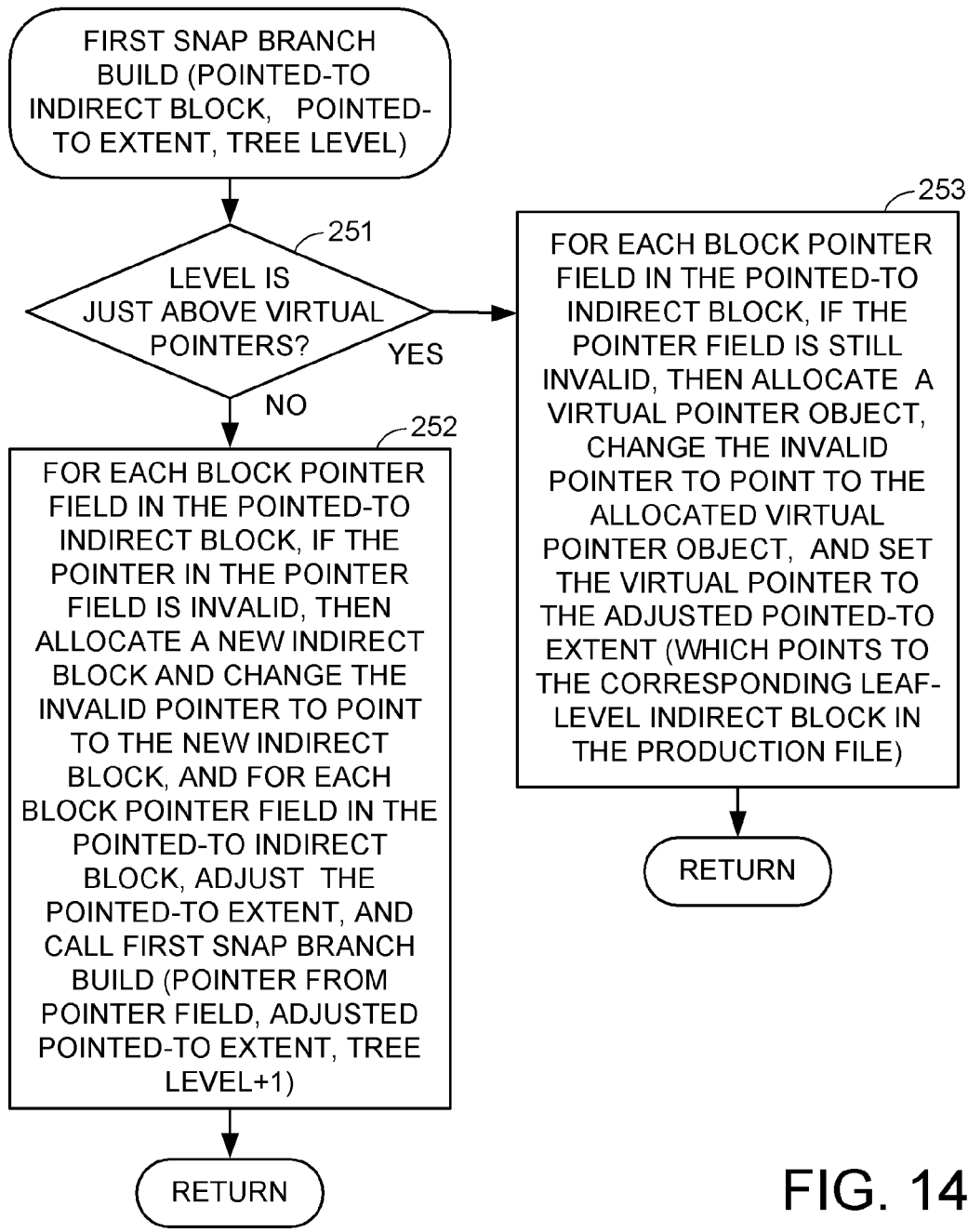
FIG. 14 is a flowchart of a recursive subroutine for building a branch of the indirect block tree for the first snapshot.

FIG. 14 shows the recursive subroutine for building a branch of the indirect block tree for the first snapshot. In a first step 251, if the tree level is not just above the virtual pointer objects, then execution continues to step 252. In step 252, for each block pointer field in the pointed-to indirect block, if the pointer in the pointer field is invalid, then a new indirect block is allocated (and its pointers set to invalid values) and the invalid pointer is changed to point to this new indirect block. Then, for each block pointer field in the pointed-to indirect block, the pointed-to extent is adjusted, and the subroutine of FIG. 14 calls itself. The pointed-to extent is adjusted for each block pointer field so that the adjusted pointed-to extent points to the production file leaf-level indirect block that maps the beginning of the same file extent as the sub-tree of the block pointer field. After step 252, execution returns.

For example, in step 252, the initial pointed-to extent as received from the subroutine call parameter is the pointed-to extent for the first block pointer field, and the pointed-to extent is incremented by a constant value that is a function of the tree level in order to get the pointed-to extent for the second block pointer field, and the pointed-to extent is again incremented by this constant value to get the pointed-to extent for the third block pointer field, and so on. Given that every indirect block includes N pointer fields, then this constant value is one for the level just above the leaf level (i.e., the level in which the indirect block of the snapshot has pointers to the virtual pointer objects), this constant value is N for the level above this level, and this constant value is N squared for the next level above this, and so on.

In step 251, if the tree level is just above the leaf-level indirect blocks, then execution branches to step 253. In step 253, for each block pointer field in the pointed-to indirect block, if the pointer in the block pointer field is still invalid, then a virtual pointer object is allocated, the invalid pointer is changed to point to the allocated virtual pointer object, and the virtual pointer is set to the adjusted pointed-to extent (which points to the corresponding leaf-level indirect block in the production file). After step 253, execution returns.

Figure 15:
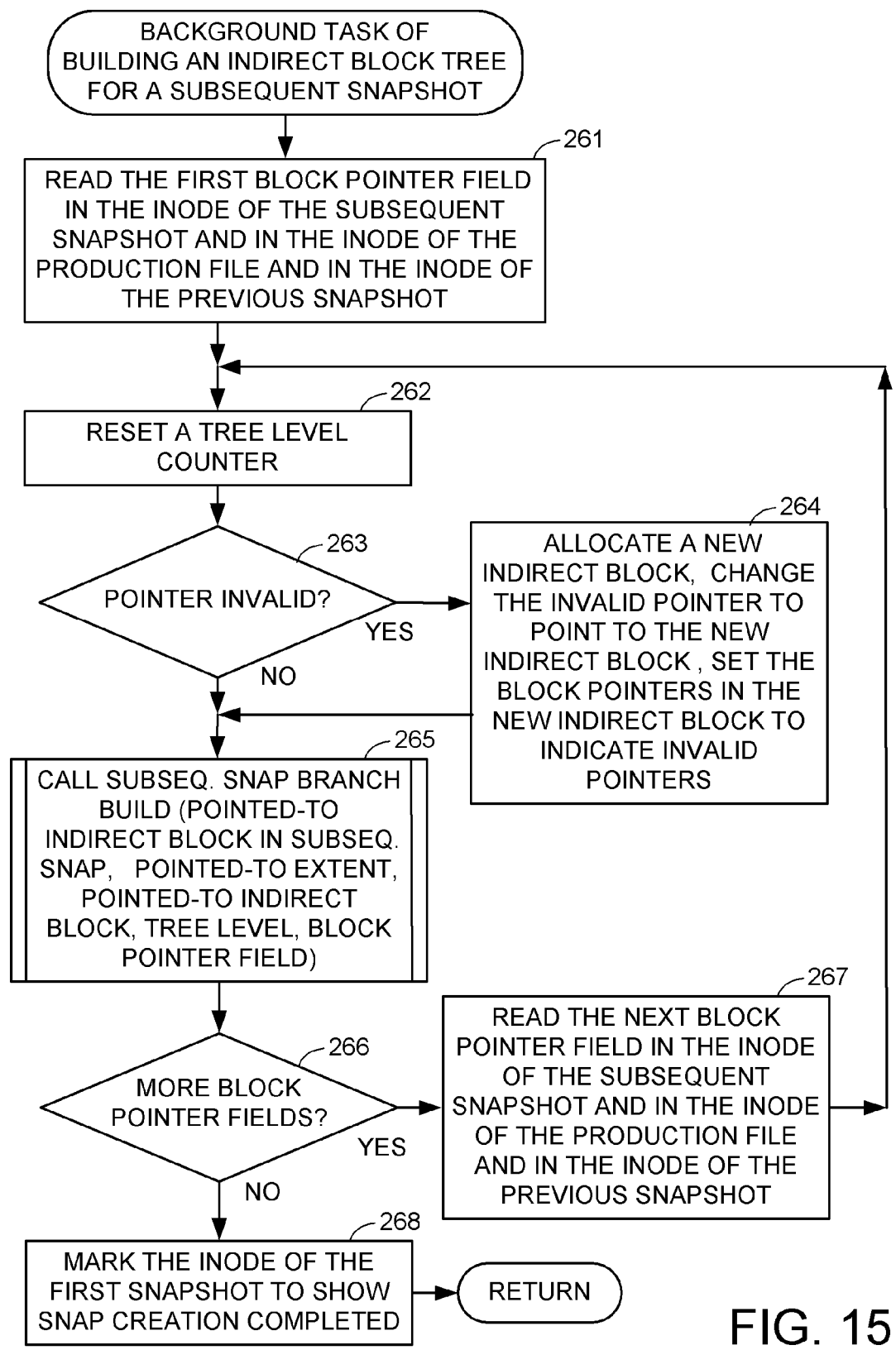
FIG. 15 is a flowchart of a background task of building an indirect block tree for a subsequent snapshot.

FIG. 15 shows a background task of building an indirect block tree for a subsequent new snapshot. This background task is similar to the background task of FIG. 13 except that there is an additional downward search of the previous snapshot, and this additional downward search of the previous snapshot is synchronized with the downward search of the subsequent new snapshot. This additional downward search of the previous snapshot is done so that the subsequent new snapshot will share, if possible, any duplicate virtual pointer objects and any duplicate indirect blocks of the previous snapshot. Indirect blocks are allocated to the subsequent new snapshot during the downward search and de-duplicated if possible during the upward return from the downward search.

In a first step 261, the first block pointer field is read in the inode of the new subsequent snapshot and in the inode of the production file and in the inode of the previous snapshot. In step 262, a tree level counter is reset. In step 263, if the block pointer in the new subsequent snapshot inode is invalid, then execution branches to step 264. In step 264, a new indirect block is allocated, the invalid block pointer value is changed to point to this new indirect block, and the block pointers in this new indirect block are set to indicate invalid pointers. Execution continues from step 264 to step 265. Execution also continues from step 263 to step 265 to call a recursive subroutine to build a branch of the snapshot from the indirect block pointed to by the pointer now in the present block pointer field of the new subsequent snapshot inode, and to link this branch with the corresponding extent of leaf-level indirect blocks unless these leaf-level indirect blocks change first as a result of client write operations upon the production file since the point-in-time of the new subsequent snapshot (i.e., since the time of steps 225 to 227 in FIG. 12). Any client write operations upon the production file during the processing of the background task of FIG. 15 will interrupt the processing of this background task. Execution continues from step 265 to step 266.

In step 266, if there are more block pointer fields in the snapshot inode, then execution branches to step 267. In step 267, the next block pointer field is read in the new subsequent snapshot and in the inode of the production file and in the inode of the previous snapshot. Execution loops from step 267 back to step 262.

In step 266, once there are no more block pointer fields of the new subsequent snapshot inode from which to build new branches, execution continues to step 268. In step 268, the inode of the first snapshot is marked to show that the snapshot creation has been completed, and then execution returns.

Figure 16:
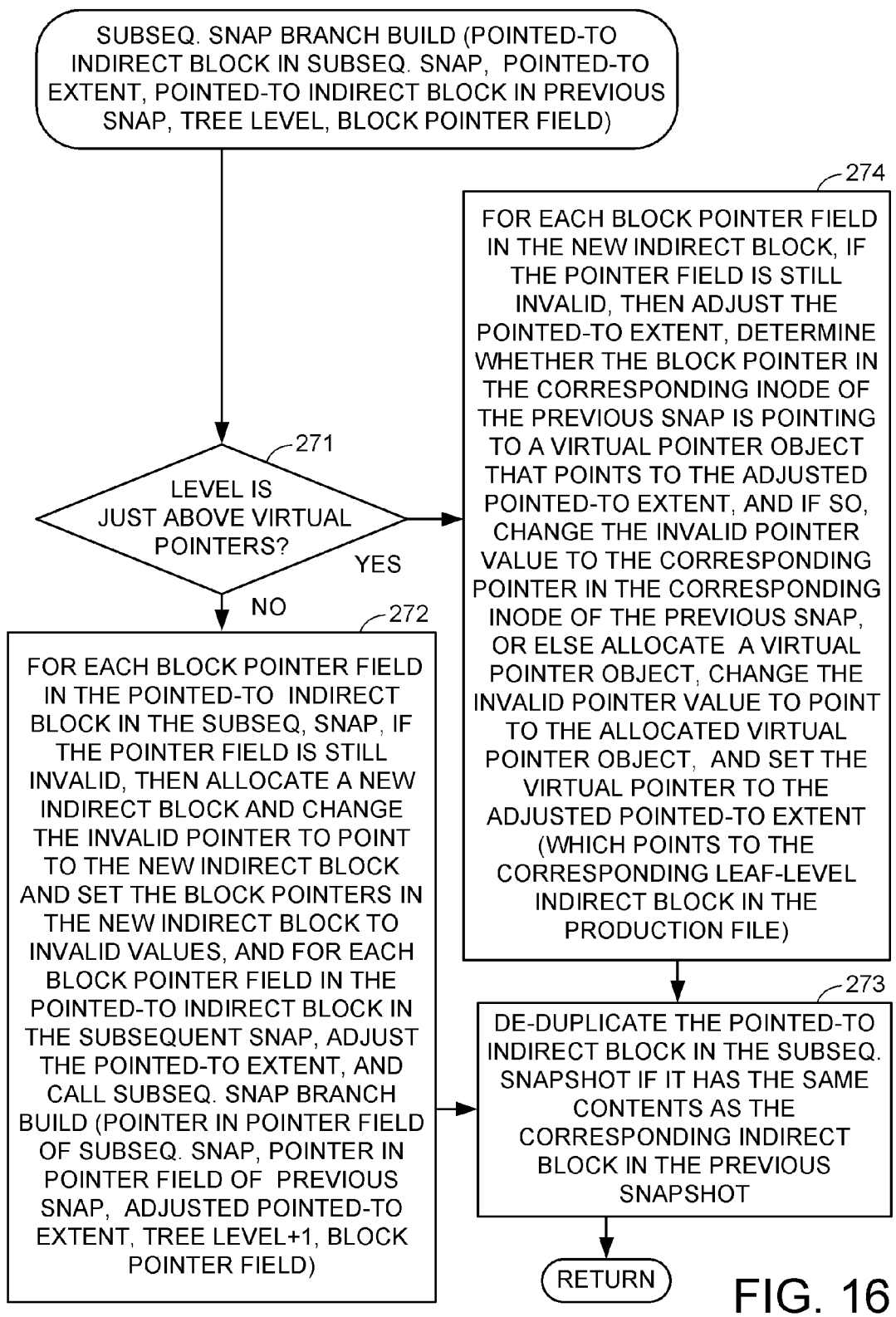
FIG. 16 is a flowchart of a recursive subroutine for building a branch of the indirect block tree for the subsequent snapshot.

FIG. 16 shows the recursive subroutine for building a branch of the indirect block tree for the new subsequent snapshot. In a first step 271, if the tree level is not just above the virtual pointer objects, then execution continues to step 272. In step 272, for each block pointer field in the pointed-to indirect block, if the pointer in the pointer field is invalid, then a new indirect block is allocated (and its pointers set to invalid values) and the invalid pointer is changed to point to this new indirect block. Then, for each block pointer field in the pointed-to indirect block, the pointed-to extent is adjusted, and the subroutine of FIG. 16 calls itself. The pointed-to extent is adjusted for each block pointer field so that the adjusted pointed-to extent points to the production file leaf-level indirect block that maps the beginning of the same file extent as the sub-tree of the block pointer field.

After step 272, execution continues to step 273. In step 273, the pointed-to indirect block in the new subsequent snapshot is de-duplicated if it has the same contents as the corresponding indirect block in the previous snapshot. The pointed-to indirect block in the new subsequent snapshot is de-duplicated by changing the pointer to it in the parent block of the new subsequent snapshot with a pointer to the corresponding indirect block in the previous snapshot, and then de-allocating the pointed-to indirect block in the new subsequent snapshot. The "BLOCK POINTER FIELD" parameter of the subroutine of FIG. 16 contains the block address of the parent block and an index of the block pointer field in this parent block into which the changed pointer is written.

In step 271, if the tree level is just above the virtual pointers, then execution branches to step 274. In step 274, for each block pointer field in the pointed-to indirect block, if the pointer in the pointer field is still invalid, then a virtual pointer object is allocated, the invalid pointer is changed to point to the allocated virtual pointer object, and the virtual pointer is set to the adjusted pointed-to extent (which points to the corresponding leaf-level indirect block in the production file). After step 274, execution continues to step 273.

Figure 18:
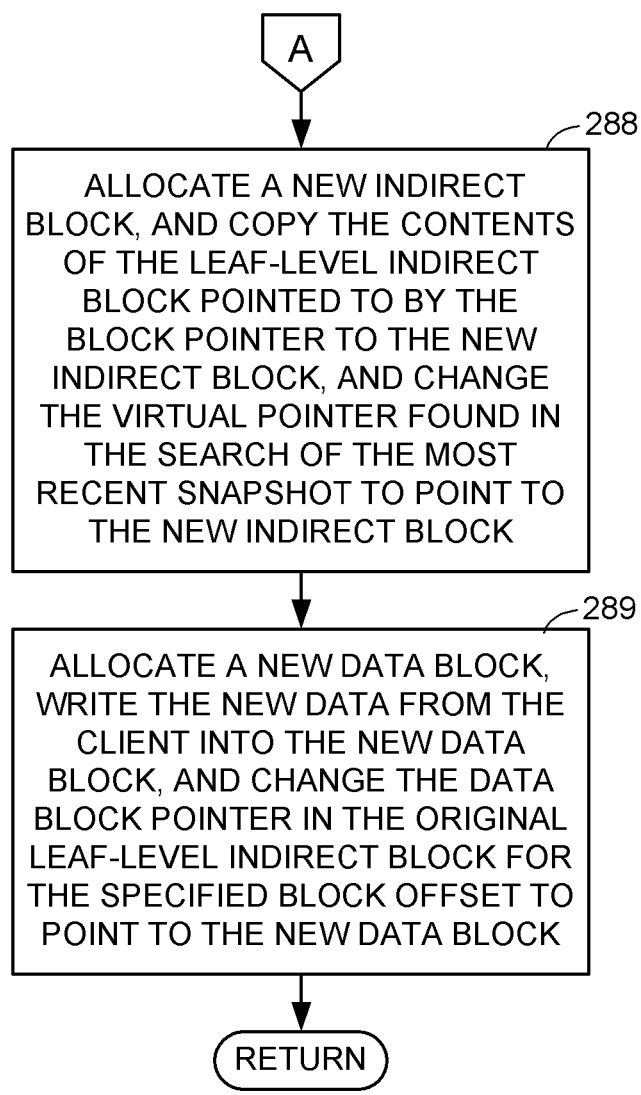

FIGS. 17 and 18 together show a procedure for responding to a client request to write new data to a specified block offset in the production file. In a first step 281, the snapshot copy facility calculates the block pointer to the leaf-level indirect block mapping the specified block offset in the production file. Next, in step 282, the snapshot copy facility searches the block hierarchy of the most recent snapshot of the production file to find the block pointer to the leaf-level indirect block mapping the specified block offset in the snapshot copy. For any invalid pointer found in the downward search path from the inode of the most recent snapshot, the snapshot copy facility allocates a new indirect block or virtual pointer object and changes the invalid pointer to point to the new indirect block or virtual pointer object. If a new virtual pointer object is added, then in step 283, execution branches to step 288 in FIG. 18. Otherwise, execution continues to step 284.

In step 284, the block pointer value calculated in step 281 for the production file is compared to the block pointer value found in step 282 for the most recent snapshot. If they are the same, then execution continues to step 288 in FIG. 18. Otherwise, if they are not the same, then execution branches to step 286. In step 286, the block pointer value calculated for the production file is used to access the pointed-to leaf-level indirect block to get a pointer to the data block at the specified block offset in the production file. Then, in step 287, the pointer to the data block at the specified block offset in the production file is used to write the new data to this data block at the specified offset in the production file, and execution returns.

In step 288 of FIG. 18, a new indirect block is allocated, and the contents of the leaf-level indirect block pointed to by the block pointer calculated for the production file are copied to the new indirect block, and the virtual pointer of the virtual pointer object allocated or found during the search of the indirect block tree of the most recent snapshot is changed to point to the new indirect block. Then, in step 289, a new data block is allocated, and the new data from the client is written into the new data block, and the data block pointer in the original leaf-level indirect block (in the extent of contiguous leaf-level indirect blocks of the production file) for the specified block offset is changed to point to the new data block. After step 288, execution returns.

Figure 19:
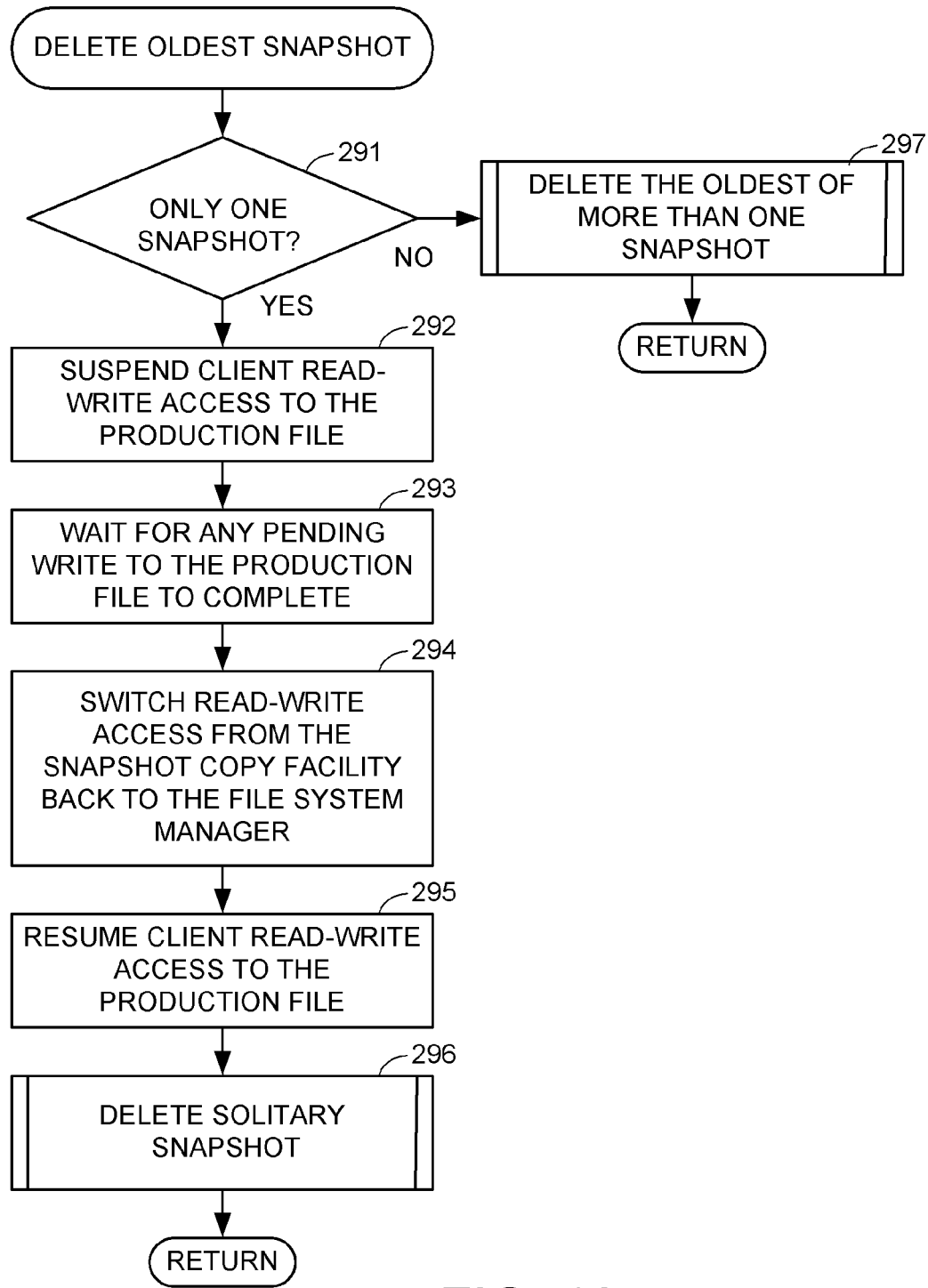
FIG. 19 is a flowchart of a procedure for deleting an oldest snapshot.

FIG. 19 shows a procedure for deleting an oldest snapshot of the production file. In a first step 291, if there is only one snapshot of the production file, then execution continues to step 292. In this case, the oldest snapshot is a solitary snapshot of the production file, so that no snapshots of the production file will remain, and client read-write access will revert to the file system manager. In step 292, the snapshot copy facility suspends client read-write access to the production file. In step 293, the snapshot copy facility waits for any pending write to the production file to complete. Then in step 294, the snapshot copy facility switches the processing of read-write access to the production file back to the file system manager, and in step 295, client read-write access to the production file is resumed. Finally, in step 296, the snapshot copy facility calls a subroutine of FIG. 20 to delete the solitary snapshot, and execution returns. The deletion of the solitary snapshot is done in background, so that any client read or write request upon the production file will interrupt the subroutine of FIG. 20.

In step 291, if there is more than one snapshot, then execution branches to step 297. In step 297, the snapshot copy facility calls a subroutine of FIG. 23 to delete the oldest snapshot. The deletion of the oldest snapshot is done in background, so that any client read or write request will interrupt the subroutine of FIG. 23.

Figure 20:
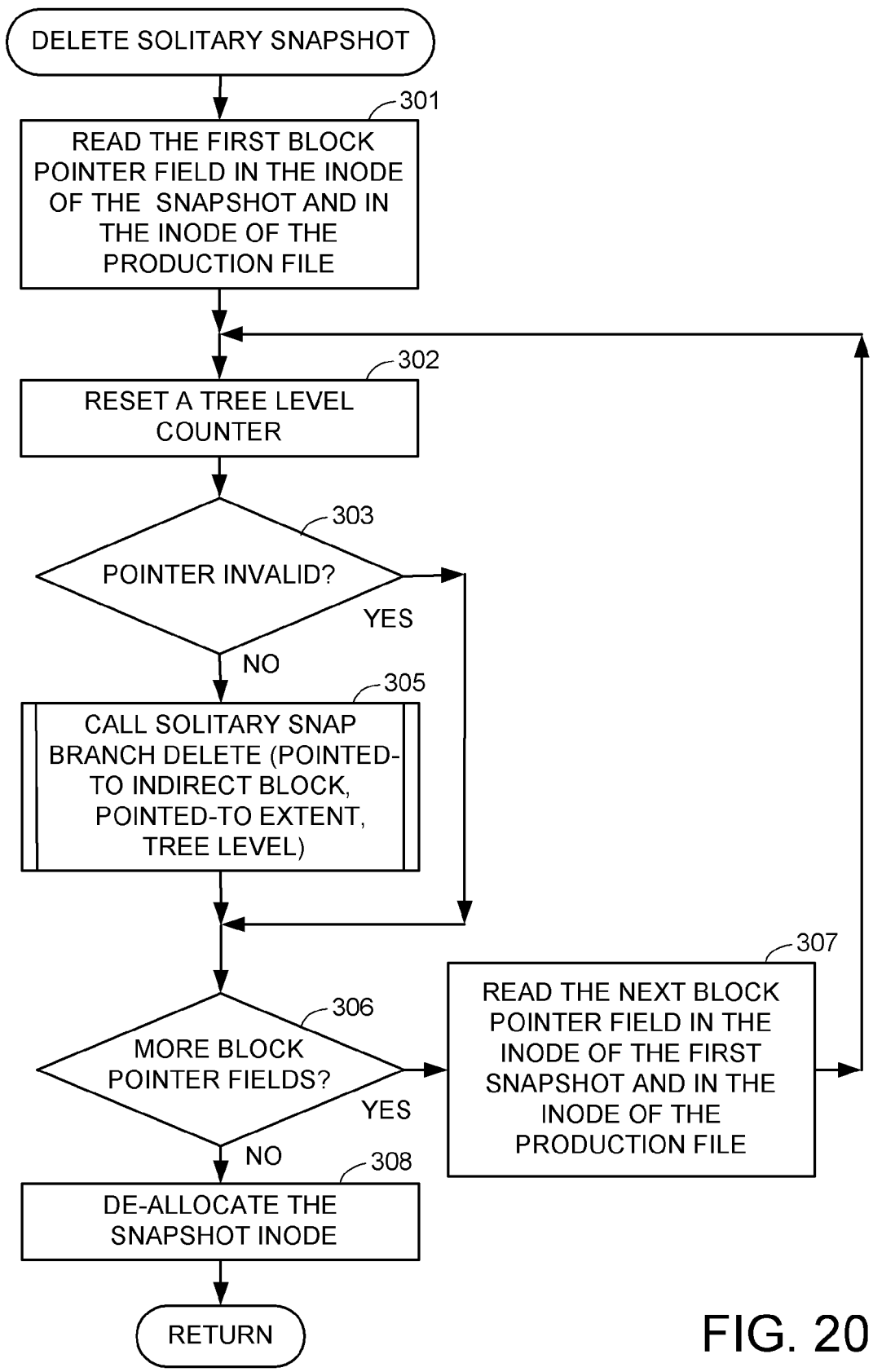
FIG. 20 is a flowchart of a subroutine for deleting a solitary snapshot.

FIG. 20 shows the subroutine for deleting a solitary snapshot. The subroutine does a depth-first scan of the indirect block tree of the snapshot to delete any and all data blocks and leaf-level indirect blocks not shared with the production file, and to delete all of the other indirect blocks of the snapshot, and finally to delete the inode of the snapshot.

In a first step 301, a first block pointer field is read in the inode of the snapshot and in the inode of the production file. In step 302, a tree level counter is reset. In step 303, if the pointer is invalid in the snapshot inode, then execution branches to step 306. Otherwise, execution continues from step 303 to step 305 to call a subroutine to delete the branch of the solitary snapshot pointed-to by the pointer read from the snapshot inode. Execution continues from step 305 to step 306.

In step 306, if there are more block pointer fields in the inodes, then execution branches to step 307. In step 307, the next block pointer field is read in the inode of the first snapshot and in the inode of the production file, and execution loops back to step 302. Once all of the pointed-to branches of the snapshot block tree have been deleted in this fashion, there are no more block pointer fields to access, and execution continues from step 306 to step 308. Finally, in step 308, the snapshot inode is de-allocated, and execution returns.

Figure 21:
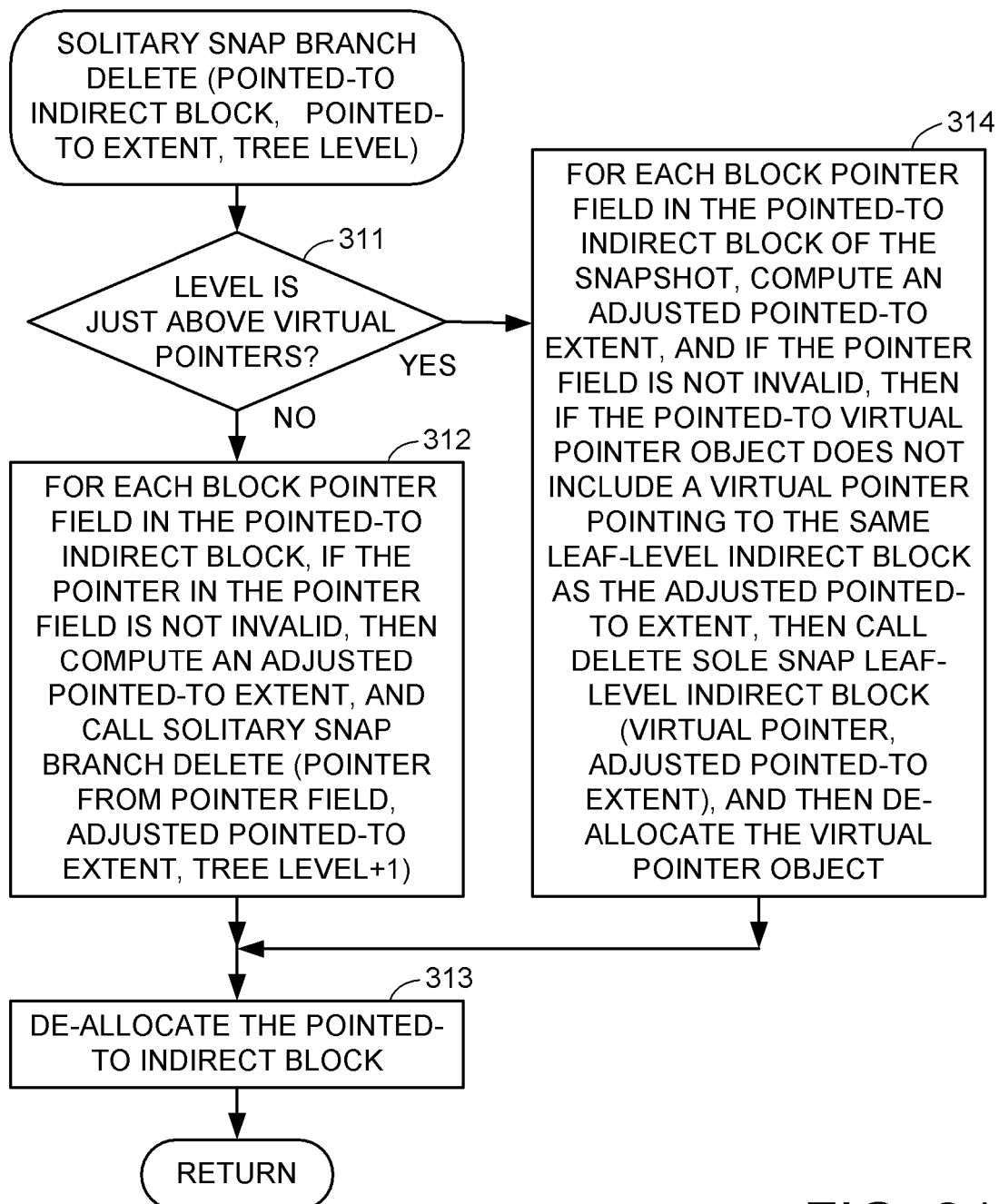
FIG. 21 is a recursive subroutine for deleting a branch of a solitary snapshot.

FIG. 21 shows the subroutine for deleting a branch from a pointed-to indirect block of a solitary snapshot. In a first step 311, if the level of the pointed-to indirect block is not just above the virtual pointers, then execution continues to step 312. In step 312, for each block pointer field in the pointed-to indirect block, if the pointer in the pointer field is not invalid, then an adjusted extent is computed, and then the subroutine of FIG. 21 calls itself to continue the scan of the snapshot block tree down to the next lower level. Upon return, in step 313, the pointed-to indirect block is de-allocated, and execution returns.

Figure 22:
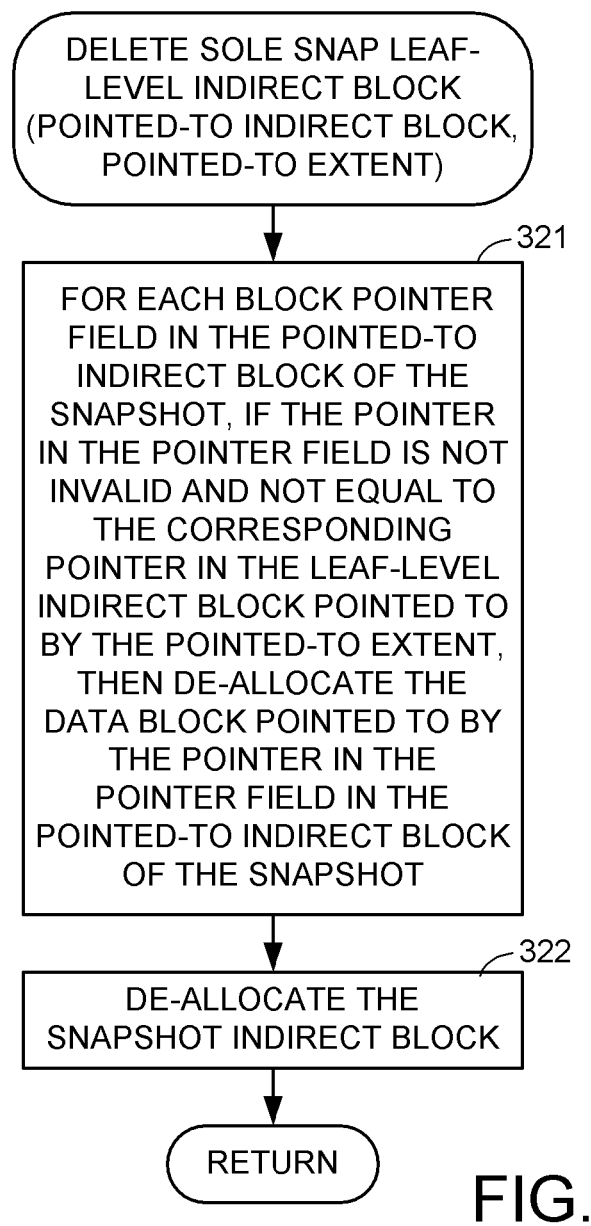
FIG. 22 is a subroutine for deleting a leaf-level indirect block of a solitary snapshot not shared with the production file and deleting the data blocks that are mapped by this leaf-level indirect block and not shared with the production file.

In step 311, if the level of the pointed-to indirect block is just above the virtual pointers, then execution branches to step 314. In step 314, for each block pointer field in the pointed-to indirect block, an adjusted pointed-to extent is computed, and if the pointer field is not invalid, then if the pointed-to virtual pointer object does not include a virtual pointer pointing to the same leaf-level indirect block as the adjusted pointed-to extent, then a subroutine shown in FIG. 22 is called to delete the leaf-level indirect block pointed-to by the virtual pointer, and the virtual pointer object is also deleted. Execution continues from step 314 to step 313.

FIG. 22 shows the subroutine for deleting a solitary snapshot leaf-level indirect block not shared with the production file. In a first step 321, for each block pointer in the pointed-to indirect block of the snapshot, if the pointer in the pointer field is not invalid and is not equal to the corresponding pointer in the leaf-level indirect block pointed to by the pointed-to extent, then the data block pointed to by the pointer in the pointer field of the pointed-to indirect block of the snapshot is de-allocated. Execution continues from step 321 to step 322. In step 322, the pointed-to indirect block of the snapshot is de-allocated, and execution returns.

Figure 23:
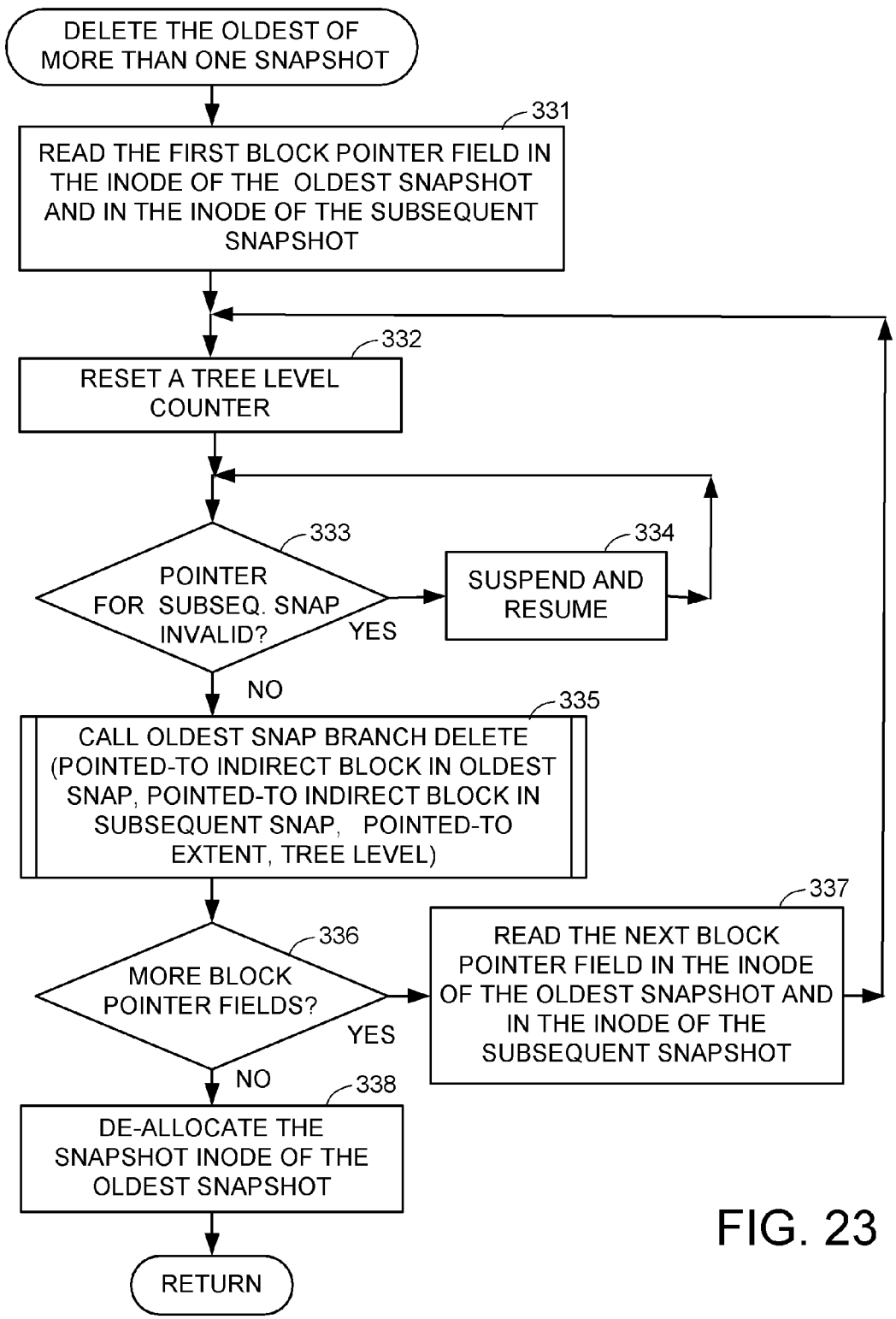
FIG. 23 is a subroutine for deleting the oldest of more than one snapshot.

FIG. 23 shows the subroutine for deleting the oldest of more than one snapshot. The subroutine does a depth-first scan of the indirect block tree of the oldest snapshot and a simultaneous depth-first scan of the indirect block tree of the subsequent snapshot to delete any and all data blocks and indirect blocks not shared with the subsequent snapshot, and finally to delete the inode of the snapshot.

In a first step 331, the snapshot copy facility reads the first block pointer field in the inode of the oldest snapshot and in the inode of the subsequent snapshot in the series of snapshots of the production file. Then, in step 332, a tree level counter is reset. In step 333, if the pointer is invalid in the block pointer field in the inode of the subsequent snapshot, then execution branches to step 334 to suspend execution for a time and then resume execution and then loop back to step 333. Thus, deletion of this branch of the indirect block tree of the oldest snapshot waits until the corresponding branch of the indirect block tree of the subsequent snapshot has been built.

Figure 24:
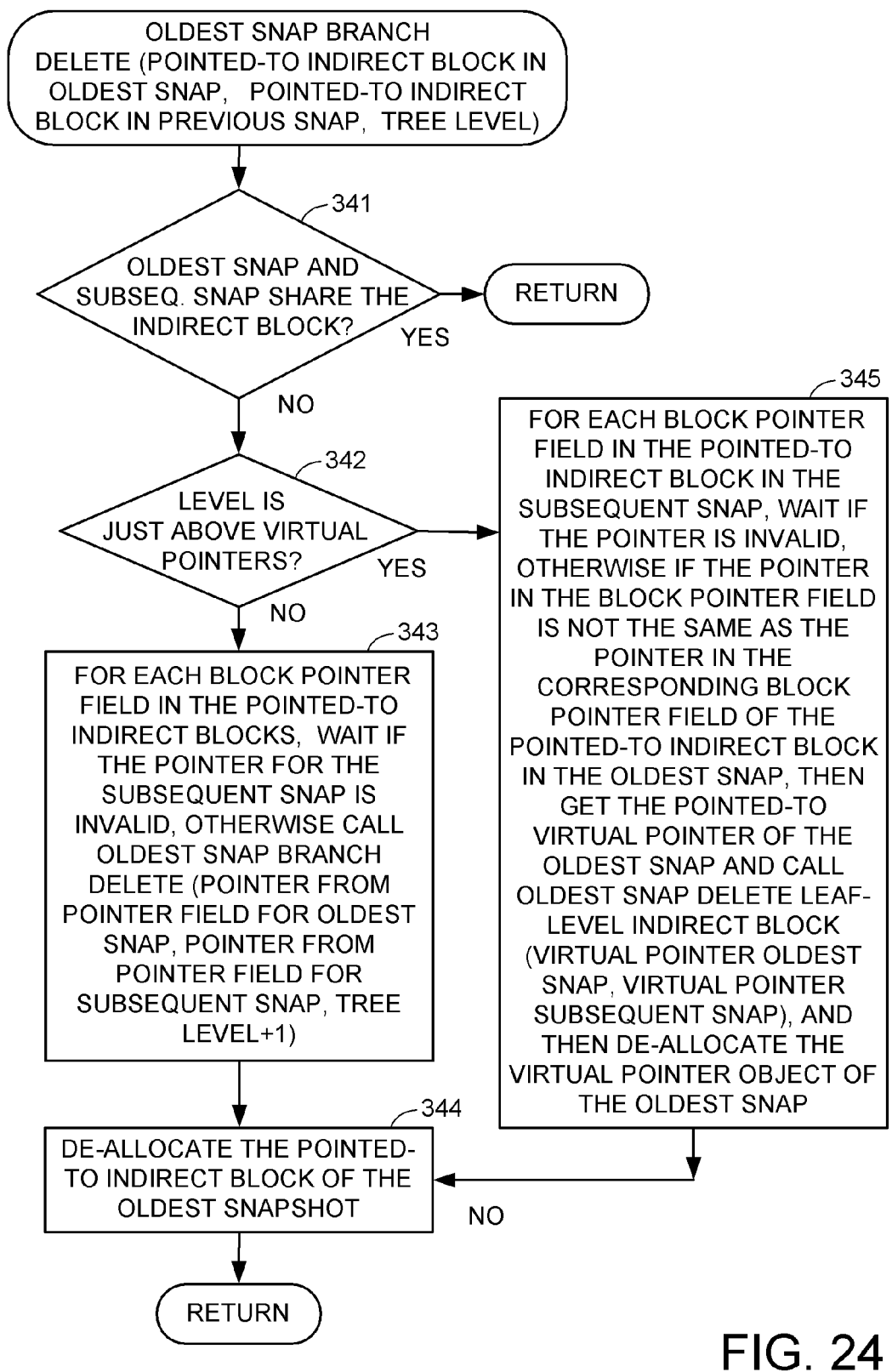
FIG. 24 is a subroutine for deleting a branch of the oldest of more than one snapshot.

When the block pointer for the subsequent snapshot is valid, execution continues from step 333 to step 335. In step 335, a subroutine in FIG. 24 is called to delete the branch of the oldest snapshot. Upon return, in step 336, if there are more block pointer fields in the snapshot inodes, then execution branches to step 337. In step 337, the next block pointer field is read in the inode of the oldest snapshot and in the inode of the subsequent snapshot, and then execution loops back to step 332.

When there are no more block pointer fields to be read in the snapshot inodes, execution continues from step 336 to step 338. In step 338, the snapshot inode of the oldest snapshot is de-allocated, and execution returns.

FIG. 24 shows the subroutine for deleting the branch of the indirect block tree for the oldest snapshot. In a first step 341, the pointer to the indirect block of the oldest snapshot is compared to the pointer to the indirect block of the subsequent snapshot to determine whether the two pointers are the same. If so, then the oldest snapshot and the subsequent snapshot are sharing the same pointed-to indirect block, so that execution returns. Otherwise, execution continues from step 341 to step 342.

In step 342, if the tree level is not just above the virtual pointers, then execution continues to step 343. In step 343, for each block pointer in the pointed-to indirect blocks, execution waits if the pointer for the subsequent snapshot is invalid, and when the pointer for the subsequent snapshot is valid, the subroutine of FIG. 24 calls itself to delete the branch of the oldest snapshot corresponding to the block pointer in the block pointer field of the pointed-to indirect block for the oldest snapshot. Upon return, execution continues to step 344 to de-allocate the pointed-to indirect block of the oldest snapshot.

In step 342, when the tree level is just above the virtual pointers, execution branches to step 345. In step 345, for each block pointer field in the pointed-to indirect block in the subsequent snapshot, execution waits if the pointer is invalid, and when the pointer is valid, if the pointer in the pointer field is not the same as the pointer in the corresponding block pointer field of the pointed-to indirect block in the oldest snapshot, then the pointed-to pointer object for the oldest snap is accessed to get the virtual pointer of the oldest snapshot and to call the subroutine of FIG. 25 to delete the leaf-level indirect block pointed to by the virtual pointer. Upon return, the virtual pointer object of the oldest snapshot is de-allocated. After step 345, execution continues to step 344 to de-allocate the pointed-to indirect block of the oldest snapshot.

Figure 25:
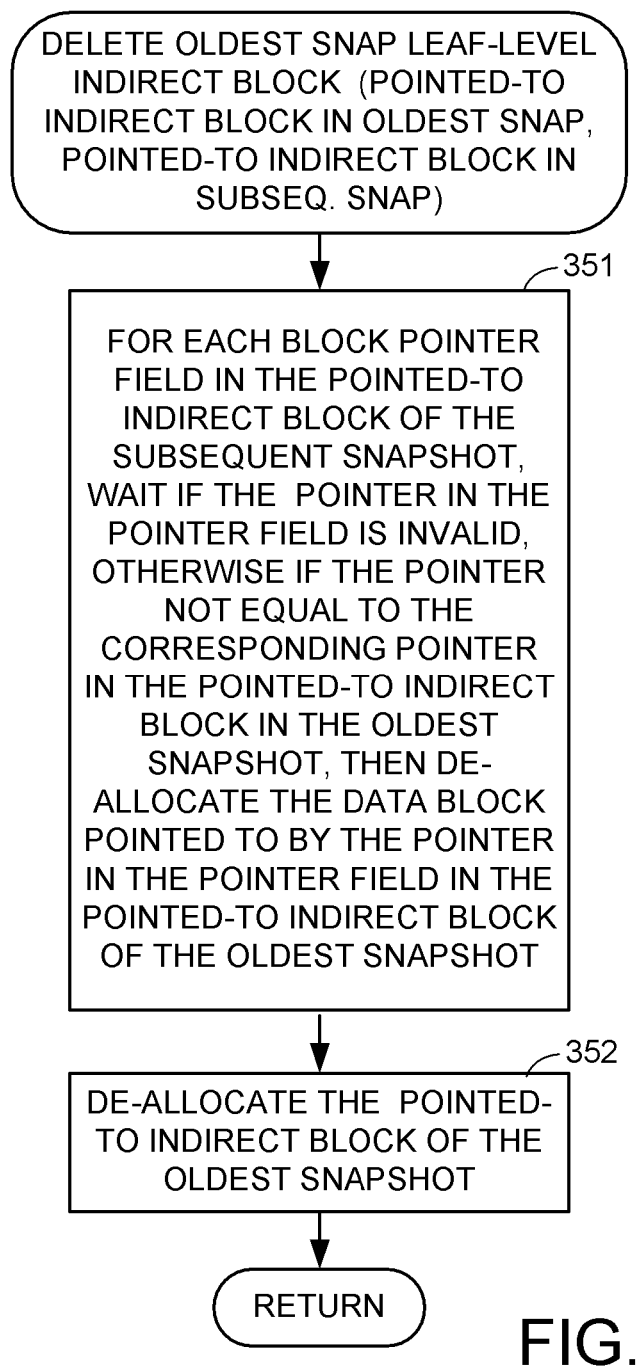
FIG. 25 is a subroutine for deleting a leaf-level indirect block of the oldest of more than one snapshot not shared with the subsequent snapshot and deleting the data blocks that are mapped by this leaf-level indirect block and not shared with the subsequent snapshot.

FIG. 25 shows the subroutine for deleting a leaf-level indirect block of the oldest snapshot. In a first step 351, for each block pointer field in the pointed-to indirect block of the subsequent snapshot, execution waits if the pointer in the pointer field is invalid. When the pointer is valid, if the pointer is not equal to the corresponding pointer in the pointed-to indirect block in the oldest snapshot, then the data block pointed to by the pointer in the pointer-to indirect block of the oldest snapshot is de-allocated. Execution continues from step 351 to step 352. In step 352, the pointed-to indirect block of the oldest snapshot is de-allocated, and then execution returns.

In view of the above, there has been described a method of creating point-in-time copies of file maps for multiple versions of a production file to preserve file map allocations for the production file. This method preserves the ability to use large extents of contiguous indirect blocks for the file mapping metadata of the production file, while allowing a series of snapshot copies of the production file to share the file mapping metadata at the much smaller, file system block granularity. The creation and deletion of a snapshot copy are done by background tasks that are interrupted to service client read-write access to the production file on a priority basis, so that the method does not disrupt the client read-write access. To preserve the contiguity of an extent of the contiguous indirect blocks of the production file when maintaining the series of snapshots, the snapshots share these indirect blocks through virtual pointers. When a write to a data block of the production file is first done since the point-in-time of the most recent snapshot so that the most recent snapshot can no longer share one of the contiguous indirect blocks, a new indirect block is allocated to store the file mapping metadata for the most recent snapshot, and a virtual pointer for the snapshots is changed to point to this new indirect block. Therefore the change in the virtual pointer changes the file mapping metadata for any number of snapshots sharing the new indirect block so that the method is scalable in that the number of snapshot copies has no impact on the cost of reading or writing to the production file.

What is claimed is:

1. A method of operating a file server, the file server having data storage storing a production file, a data processor coupled to the data storage for access to the production file, and non-transitory computer readable storage medium coupled to the data processor and storing computer instructions, the production file having data blocks and indirect blocks that are allocated to the production file and contain pointers to the data blocks for mapping block offsets in a logical extent of the production file to corresponding ones of the data blocks, and the computer instructions, when executed by the data processor, create a series of snapshot copies of the production file while preserving the allocations of the indirect blocks to the production file by performing the steps of:
   (a) creating a first snapshot copy of the production file by allocating a first inode to the first snapshot copy and building a first tree of pointers extending from the first inode to a first group of the indirect blocks of the production file; and then
   (b) creating a second snapshot copy of the production file by allocating a second inode to the second snapshot copy and building a second tree of pointers extending from the second inode to a second group of the indirect blocks of the production file, wherein the first tree of pointers and the second tree of pointers share pointers to indirect blocks that are included in a third group of indirect blocks that are included in both the first group of the indirect blocks of the production file and the second group of the indirect blocks of the production file, and then
   (c) in response to a request from a client of the file server to write a block of new data to a specified block offset in the logical extent of the production file, writing the block of new data to the data storage, searching one of the first tree of pointers and the second tree of pointers to find one of the pointers to one of the indirect blocks that maps the specified block offset in the logical extent of the production file to a corresponding one of the data blocks including a block of old data, said one of the indirect blocks being included in the third group of indirect blocks, and allocating a new indirect block to the snapshots, copying contents of said one of the indirect blocks to the new indirect block, changing said one of the pointers to said one of the indirect blocks to point to the new indirect block, and changing the contents of one of the new indirect block and said one of the indirect blocks so that the new indirect block maps the block of old data to the specified block offset in the logical extent of the first snapshot copy and the second snapshot copy, and said one of the indirect blocks maps the block of new data to the specified block offset in the logical extent of the production file.

2. The method as claimed in claim 1, which further includes an initial step of creating the production file by allocating an extent of contiguous indirect blocks including the first group of the indirect blocks of the production file and the second group of the indirect blocks of the production file, and setting a direct mapped file type attribute of the production file.

3. The method as claimed in claim 1, wherein step (a) includes executing a background task to build the first tree of pointers, and interrupting the background task in response to a client request to write data to a block offset in the production file mapped by a certain indirect block of the production file by extending a branch of the first tree of pointers from the first inode to the certain indirect block of the production file and then writing data to the block offset in the production file mapped by the certain indirect block of the production file.

4. The method as claimed in claim 1, wherein the building of the first tree of pointers includes allocating and linking indirect blocks between the first inode and said first group of the indirect blocks of the production file, and allocating and linking pointer objects between the indirect blocks of the first tree of pointers and the first group of the indirect blocks of the production file so that each of the indirect blocks of the first tree of pointers is linked to each of the indirect blocks in the first group of the indirect blocks of the production file through a respective one of the pointer objects and the respective one of the pointer objects includes a respective pointer to said each of the indirect blocks in the first group of the indirect blocks of the production file.

5. The method as claimed in claim 4, wherein the building of the second tree of pointers includes allocating and linking indirect blocks between the second inode and the pointer objects that include pointers to the indirect blocks in the third group of the indirect blocks of the production file.

6. The method as claimed in claim 1, wherein the building of the first tree of pointers includes allocating and linking indirect blocks between the first inode and the first group of the indirect blocks of the production file, and allocating and linking pointer objects between the indirect blocks of the first tree of pointers and the first group of the indirect blocks of the production file so that each of the indirect blocks of the first tree of pointers is linked to each of the indirect blocks of the first group of the indirect blocks of the production file through a respective one of the pointer objects;
   the building of the second tree of pointers includes allocating and linking indirect blocks between the second inode and the pointer objects that include pointers to the indirect blocks in the third group of the indirect blocks of the production file; and
   the building of the second tree of pointers includes de-duplicating indirect blocks in at least one of the first tree of pointers and the second tree of pointers so that indirect blocks are shared between the first tree of pointers and the second tree of pointers.

7. The method as claimed in claim 1, wherein the step (c) includes searching the first tree of pointers and not the second tree of pointers to find said one of the pointers to said one of the indirect blocks that maps the specified block offset in the logical extent of the production file to the corresponding one of the data blocks including the block of old data.

8. The method as claimed in claim 1, wherein the writing of the block of new data to the data storage in the step (c) includes allocating a new data block of the data storage and writing the block of new data to the new data block of the data storage, and the step (c) includes changing the contents of said one of said indirect blocks by changing a block pointer in said one of said indirect blocks to point to the new data block of the data storage.

9. A method of operating a file server, the file server having data storage storing a production file, a data processor coupled to the data storage for access to the production file, and non-transitory computer readable storage medium coupled to the data processor and storing computer instructions, the production file having data blocks and indirect blocks that are allocated to the production file and contain pointers to the data blocks for mapping block offsets in a logical extent of the production file to corresponding ones of the data blocks, and the computer instructions, when executed by the data processor, create a series of snapshot copies of the production file while preserving the allocations of the indirect blocks to the production file by performing the steps of:

(a) creating a first snapshot copy of the production file by allocating a first inode to the first snapshot copy and building a first tree of pointers extending from the first inode to a first group of the indirect blocks of the production file; and then (b) creating a second snapshot copy of the production file by allocating a second inode to the second snapshot copy and building a second tree of pointers extending from the second inode to a second group of the indirect blocks of the production file, wherein the first tree of pointers and the second tree of pointers share pointers to a third group of indirect blocks that are allocated to the production file and that are included in both the first group of the indirect blocks of the production file and in the second group of the indirect blocks of the production file; and then (c) in response to a request from a client of the file server to write a block of new data to a specified block offset in the logical extent of the production file, allocating a new block of the data storage, writing the block of new data to the new block of data storage, searching the first tree of pointers to find one of the pointers to one of the indirect blocks that maps the specified block offset in the logical extent of the production file to a corresponding one of the data blocks including a block of old data, said one of the indirect blocks being included in the third group of indirect blocks, and allocating a new indirect block to the snapshots, copying contents of said one of the indirect blocks to the new indirect block, changing the pointers to said one of the indirect blocks to point to the new indirect block, and changing the contents of said one of the indirect blocks so that the new indirect block maps the block of old data to the specified offset in the logical extent of the first snapshot copy and the second snapshot copy, and said one of the indirect blocks maps the block of new data to the specified block offset in the logical extent of the production file.

10. The method as claimed in claim 9, which further includes an initial step of creating the production file by allocating an extent of contiguous indirect blocks including the first group of the indirect blocks of the production file and the second group of the indirect blocks of the production file, and setting a direct mapped file type attribute of the production file.

11. The method as claimed in claim 9, wherein step (a) includes executing a background task to build the first tree of pointers, and interrupting the background task in response to a client request to write data to a block offset in the production file mapped by a certain indirect block of the production file by extending a branch of the first tree of pointers from the first inode to the certain indirect block of the production file and then writing data to the block offset in the production file mapped by the certain indirect block of the production file.

12. The method as claimed in claim 9, wherein the building of the first tree of pointers includes allocating and linking indirect blocks between the first inode and the first group of the indirect blocks of the production file, and allocating and linking pointer objects between the indirect blocks of the first tree of pointers and the first group of the indirect blocks of the production file so that each of the indirect blocks of the first tree of pointers is linked to each of the indirect blocks in the first group of the indirect blocks of the production file through a respective one of the pointer objects and the respective one of the pointer objects includes a respective pointer to said each of the indirect blocks in the first group of the indirect blocks of the production file.

13. A file server comprising:

Data storage storing a production file;

a data processor coupled to the data storage for access to the production file; and non-transitory computer readable storage medium coupled to the data processor and storing computer instructions;

the production file having data blocks and indirect blocks that are allocated to the production file and contain pointers to the data blocks for mapping block offsets in a logical extent of the production file to corresponding ones of the data blocks, and the computer instructions, when executed by the data processor, create a series of snapshot copies of the production file while preserving the allocations of the indirect blocks to the production file by performing the steps of:

(a) creating a first snapshot copy of the production file by allocating a first inode to the first snapshot copy and building a first tree of pointers extending from the first inode to a first group of the indirect blocks of the production file; and then (b) creating a second snapshot copy of the production file by allocating a second inode to the second snapshot copy and building a second tree of pointers extending from the second inode to a second group of the indirect blocks of the production file, wherein the first tree of pointers and the second tree of pointers share pointers to a third group of indirect blocks that are included in both the first group of the indirect blocks of the production file and the second group of the indirect blocks of the production file, and then (c) in response to a request from a client of the file server to write a block of new data to a specified block offset in the logical extent of the production file, writing the block of new data to the data storage, searching one of the first tree of pointers and the second tree of pointers to find one of the pointers to one of the indirect blocks that maps the specified block offset in the logical extent of the production file to a corresponding one of the data blocks including a block of old data, said one of the indirect blocks being included in the third group of indirect blocks, and allocating a new indirect block to the snapshots, copying contents of said one of the indirect blocks to the new indirect block, changing said one of the pointers to said one of the indirect blocks to point to the new indirect block, and changing the contents of one of the new indirect block and said one of the indirect blocks so that the new indirect block maps the block of old data to the specified block offset in the logical extent of the first snapshot copy and the second snapshot copy, and said one of the indirect blocks maps the block of new data to the specified block offset in the logical extent of the production file.

14. The file server as claimed in claim 13, wherein the first group of the indirect blocks of the production file and the second group of the indirect blocks of the production file are included in a contiguous extent of indirect blocks allocated to the production file, and the production file has an attribute indicting a direct mapped file type.

15. The file server as claimed in claim 13, wherein step (a) includes executing a background task to build the first tree of pointers, and interrupting the background task in response to a client request to write data to a block offset in the production file mapped by a certain indirect block of the production file by extending a branch of the first tree of pointers from the first inode to the certain indirect block of the production file and then writing data to the block offset in the production file mapped by the certain indirect block of the production file.

16. The file server as claimed in claim 13, wherein the building of the first tree of pointers includes allocating and linking indirect blocks between the first inode and the first group of the indirect blocks of the production file, and allocating and linking pointer objects between the indirect blocks of the first tree of pointers and the first group of the indirect blocks of the production file so that each of the indirect blocks of the first tree of pointers is linked to each of the indirect blocks in the first group of the indirect blocks of the production file through a respective one of the pointer objects and the respective one of the pointer objects includes a respective pointer to said each of the indirect blocks in the first group of the indirect blocks of the production file.

17. The file server as claimed in claim 16, wherein the building of the second tree of pointers includes allocating and linking indirect blocks between the second inode and the pointer objects that include pointers to the indirect blocks in the third group of the indirect blocks of the production file.

18. The file server as claimed in claim 13, wherein the building of the first tree of pointers includes allocating and linking indirect blocks between the first inode and the first group of the indirect blocks of the production file, and allocating and linking pointer objects between the indirect blocks of the first tree of pointers and the first group of the indirect blocks of the production file so that each of the indirect blocks of the first tree of pointers is linked to each of the indirect blocks in the first group of the indirect blocks of the production file through a respective one of the pointer objects; and the building of the second tree of pointers includes allocating and linking indirect blocks between the second inode and the pointer objects that are between the indirect blocks of the first tree of pointers and the third group of the indirect blocks of the production file; and the building of the second tree of pointers includes de-duplicating indirect blocks in at least one of the first tree of pointers and the second tree of pointers so that indirect blocks are shared between the first tree of pointers and the second tree of pointers.

19. The file server as claimed in claim 13, wherein the step (c) includes searching the first tree of pointers and not the second tree of pointers to find said one of the pointers to said one of the indirect blocks that maps the specified block offset in the logical extent of the production file to the corresponding one of the data blocks including the block of old data.

20. The files server as claimed in claim 13, wherein the writing of the block of new data to the data storage in the step (c) includes allocating a new data block of the data storage and writing the block of new data to the new data block of the data storage, and the step (c) includes changing the contents of said one of said indirect blocks by changing a block pointer in said one of said indirect blocks to point to the new data block of the data storage.

* * * * *